United States Patent [19]

Collomby et al.

[11] Patent Number: 4,809,251

[45] Date of Patent: Feb. 28, 1989

[54] PREWRITTEN DATA STORAGE MEDIUM AND OPTICAL SCANNING DEVICE THEREFOR

[75] Inventors: Michel Collomby, Saubens; Daniel Bec, Villeneuve Tolosane; Jean-Louis Gerard, Ramonville St Agne, all of France

[73] Assignee: Alcatel Thomson Gigadisc, Paris, France

[21] Appl. No.: 935,222

[22] Filed: Nov. 26, 1986

[30] Foreign Application Priority Data

Nov. 27, 1985 [FR] France .................... 85 17560

[51] Int. Cl.$^4$ ............................. G11B 17/22
[52] U.S. Cl. ........................ 369/32; 369/44; 369/47; 369/59
[58] Field of Search ............ 369/32, 59, 44, 45, 369/46, 47; 358/342; 250/201, 202, 203, 204

[56] References Cited

U.S. PATENT DOCUMENTS

| | | | |
|---|---|---|---|
| 4,566,092 | 1/1986 | Gerard et al. | 369/59 |
| 4,669,077 | 5/1987 | Gerard et al. | 369/45 |
| 4,685,096 | 8/1987 | Romeas | 369/44 |
| 4,704,711 | 11/1987 | Gerard et al. | 369/59 |

Primary Examiner—William M. Shoop, Jr.
Assistant Examiner—Brian Young
Attorney, Agent, or Firm—Cushman, Darby & Cushman

[57] ABSTRACT

Data is stored on a prewritten optical data storage medium along a track made up of adjacent elements. A scanning light spot focussed on the medium has to be able to access any element to write, read or modify data there. Prewritten patterns on the medium define a radial graduation scale that is analyzed by an optical scanning device using a sampling technique to determine the absolute position of the scanning light spot relative to the track elements, the only material representation of which may be discrete prewritten elements. The technology is particularly applicable to very high density optical memories using a prewritten disk written by thermo-optical interaction with an intensity modulated laser beam.

33 Claims, 15 Drawing Sheets

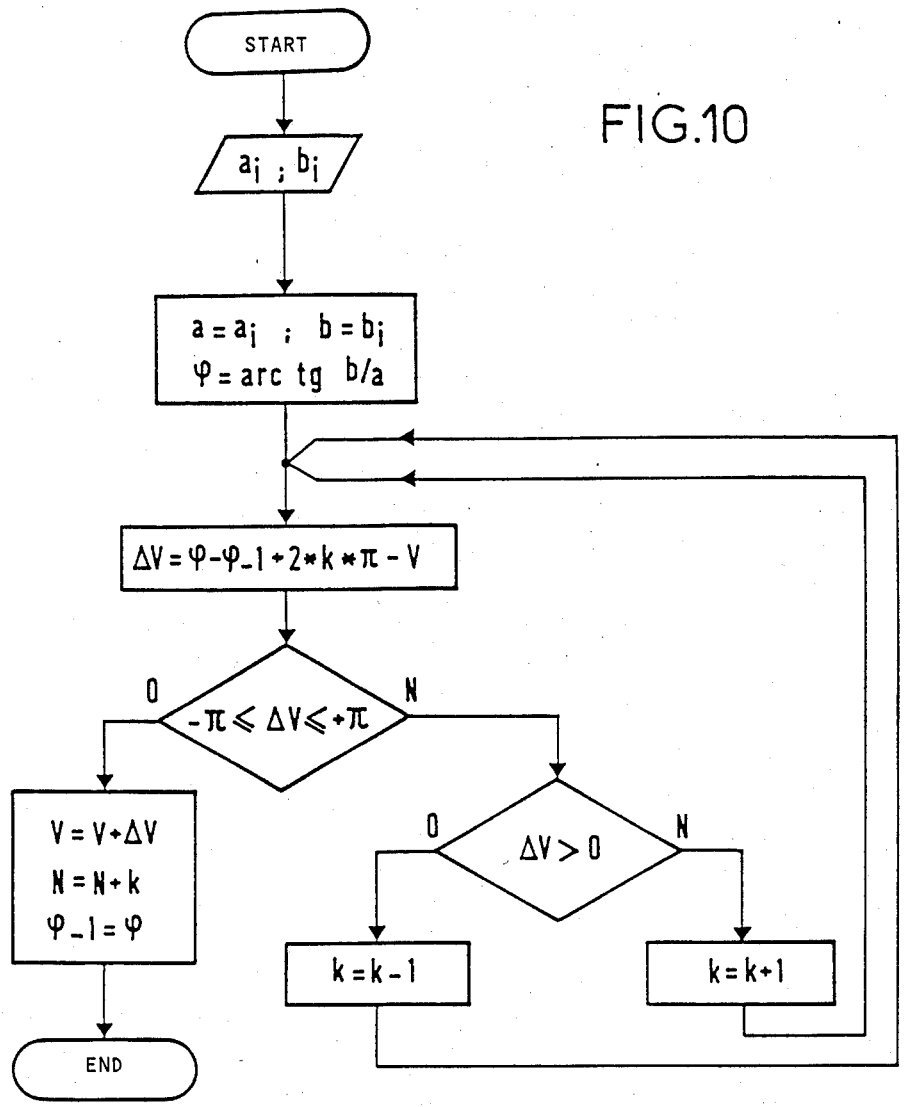
FIG.10
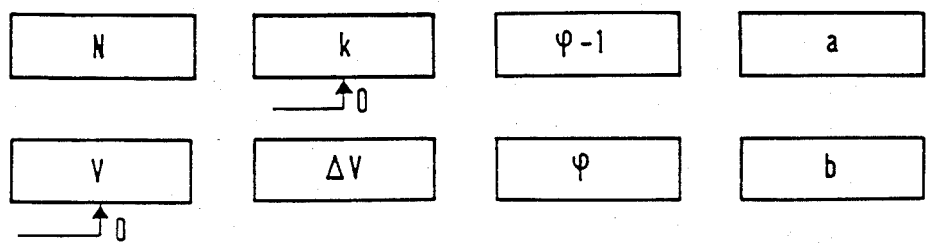

FIG.12
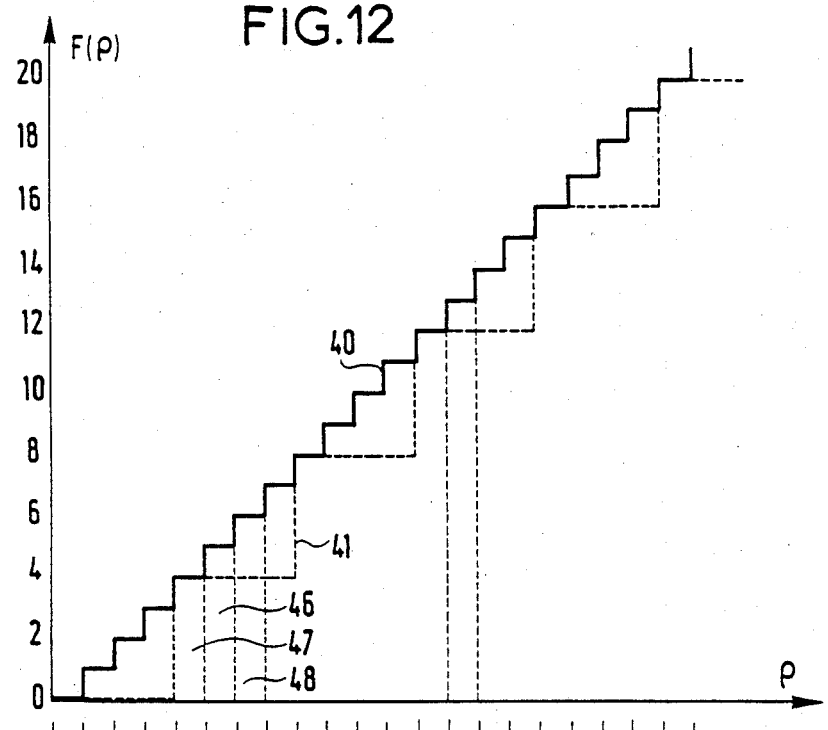
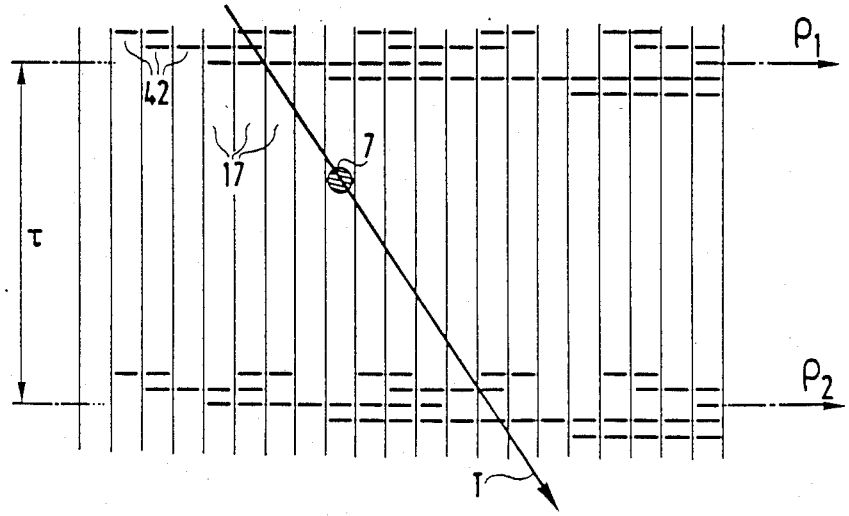

PREWRITTEN DATA STORAGE MEDIUM AND OPTICAL SCANNING DEVICE THEREFOR

BACKGROUND OF THE INVENTION

1. Field of the invention

The present invention concerns optical memory devices providing access to areas reserved for storage of data and defined by appropriately arranging the reference surface of a disk.

2. Description of the prior art

The data is stored by means of a read-write device that essentially comprises drive means for rotating the disk and a radially movable optical head which projects onto the reference surface through an objective lens a finely focussed light spot. The disk is prewritten to show up in the reference surface the areas intended to receive the data. These areas are situated on a spiral track or on concentric circular track elements. The essential tasks for the optical head are to read the prewritten information, to write data, to read data and, where appropriate, to erase data. To implement these various tasks when the data on the disk is highly dense it is necessary to provide focussing and track following control systems. Scanning the track also makes it necessary to provide synchronization means, because each element of data is assigned to elementary sites disposed serially along the track to which reference is made by means of synchronization patterns situated on specific radii that are equi-angularly distributed.

Given that the disk comprises a structure that is optically writable by reversibly or irreversibly modifying its optical characteristics, it is prudent to avoid writing data in certain parts of the reference surface that are periodically scanned to implement the synchronization, track following and focussing functions. The areas reserved for writing data are then free of any prewritten information or, in the limit, provided with only a prewritten groove which plays no role in controlling the light beam projected by the optical head. A disk that has been preformatted according to this principle is generally read by a write-read device which responds to samples in the electrical read signal each time that the light spot interacts with prewritten patterns inserted between blocks of data.

For controlling the radial position of the optical head, that is to say in order to have the scanning light spot follow a given track element in a set comprising several tens of thousands of such elements, each element is given an identity in the form of a digital address.

This arrangement is used at the end of an access to check the accuracy with which the head is positioned; it may not be sufficient in itself, as it is a lengthy process. Provision is generally made for also checking the advance of the read head by measuring its radial displacement from the start position until addresses near the destination point can be read.

For measuring a displacement it is known to use a member such as a screw to displace the optical head, continuous or stepwise rotation of which indicates the amplitude and sign of displacement. It is also known to associate with a displacement motor a measuring system such as an optical rule which determines the actual displacement of the optical head. These devices have the disadvantage of being slow and/or complex, but they are in any event inadequate in that they do not provide any measure of the displacement of the read light spot relative to the prewritten information. The prewritten information may be eccentric to the rotation axis of the disk with the result that even if the read light spot is fixed in space it periodically traverses several dozen track elements.

To alleviate these disadvantages it is known to use a track crossing counting technique but this presupposes that the track is continuous and that the signals used for counting originate from photosensor means adapted to produce sensed signals in phase quadrature. Counting crossings of a continuous track implies the presence of a prewritten groove in the areas where data is stored and leads to the adoption for other areas of a form of prewritten information that is relatively difficult to employ.

Experience shows that the sampling technique ensures correct track following even though the track is only materialized by a limited number of prewritten patterns grouped together between the blocks of data. Thus a disk is scanned in the same way whether it comprises written data or not, which considerably facilitates the choice of the coatings used to store the data because the writing contrast has no influence on the contrast of the prewritten patterns.

Experience shows that the sampling technique can be extended to counting track crossings even where these occur between two samplings of sensed signals. Also, the track crossing counting method that consists in deducing an address from another address on the bias of the indication provided by a counter can be replaced by address indications read "on the fly" which localize even better the scanning light spot in the memory plane if the track crossings are less frequent relative to the sampling frequency used to acquire samples marking the trajectory. The availability of an accurate knowledge of the position of the scanning light spot relative to the prewritten structure results in particular from the fact that the crossing speed changes relatively slowly enabling a good analysis of the radial access. This is particularly true at the beginning and at the end of an access where the speeds are low.

SUMMARY OF THE INVENTION

In one aspect, the invention consists in a data storage medium in the form of a disk comprising a reference surface, a set of adjacent track elements on said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to P of said N radii, and a graduation scale on said radii of said at least one other set consisting of a radii arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement.

In another aspect, the invention consists in an optical scanning device adapted to ulitize a data storage medium in the form of a disk comprising a reference surface, a set of adjacent track elements on said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to P of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising an optical head adapted to project a focussed scanning light spot onto said reference surface, an access motor, means driven by said access motor for moving said light spot along a path traversing said track elements, photosensing means associated with said optical head adapted to recover some of the light reflected from said reference surface where it is illuminated by said light spot, and control means for said access motor connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute quantity representing the radial position of said light spot by a number characterizing said graduation scale.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 10 is a flowchart showing how samples acquired during an access are processed.

FIG. 12 illustrates an absolute addressing mode and how it is employed during a sampling mode access.

DESCRIPTION OF THE PREFERRED EMBODIMENTS

Figure 1:
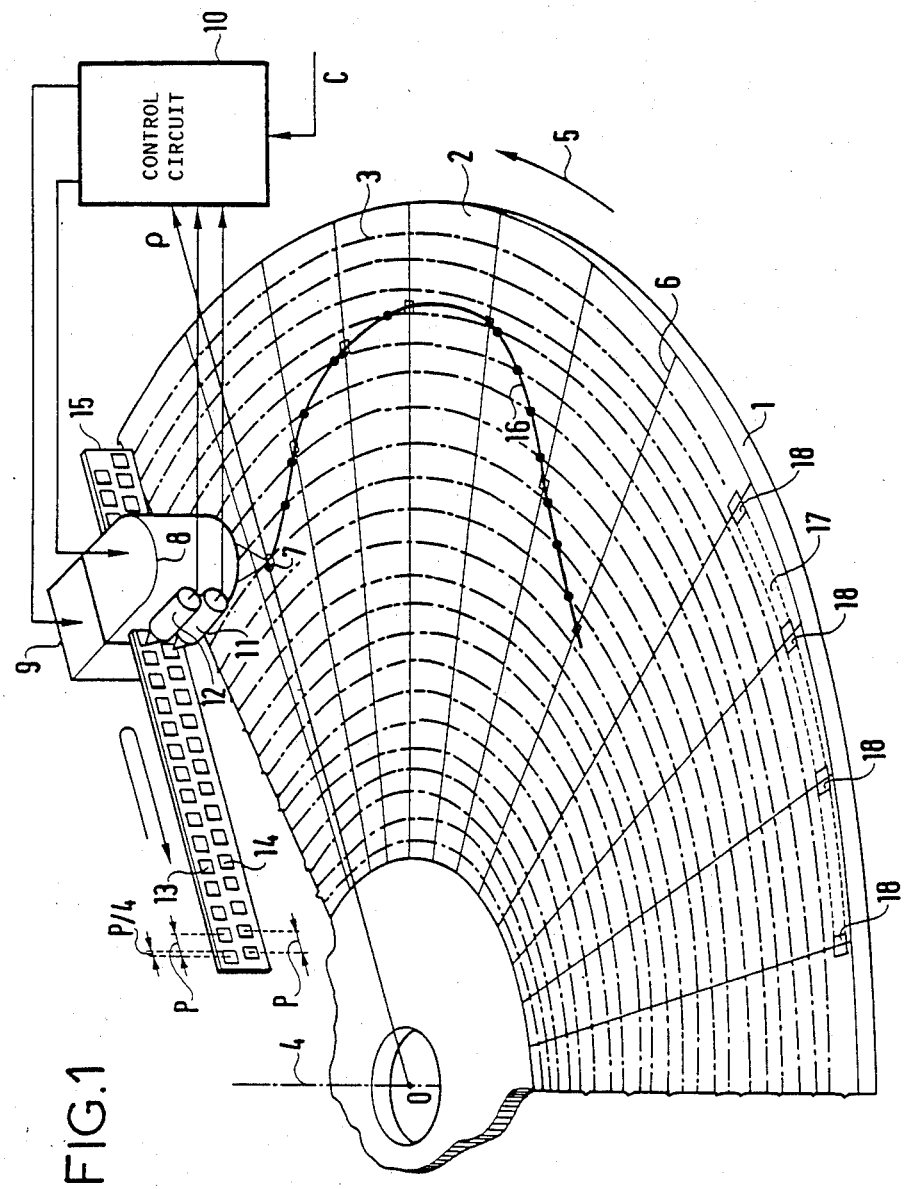
FIG. 1 is a partial isometric view of a device for optically scanning a data storage medium.

FIG. 1 shows an optical disk 1 the reference surface 2 of which is doubly subdivided radially and circumferentially. The radial subdivision is effected by writing into an annular area a track made up of concentric circular elements or successive turns of a spiral curve. This first subdivided configuration of the annular area is shown in FIG. 1 by the chain-dotted line axes 3 drawn on the reference surface 2. This first array of curved lines has a common center 0 which ideally would be on the rotation axis 4 of a spindle for rotating the disk 1, not shown in FIG. 1. The disk 1 is rotated at uniform speed in the direction of the arrow 5, for example. A second subdivided configuration of the annular area is constituted by a set of N equi-angularly distributed radii 6 shown in full line in the FIG. Thus the disk 1 constitutes a memory plane compartmented into N sectors with in each of these a large number of curved locations used to store data and scanned in a centered way using a light spot 7. The light spot 7 is produced by an optical head 8 which is movable parallel to the radius $\rho$, for example. The optical head could equally well be moved along a circular arc intersecting the track but to simplify the description it has been assumed that the optical head 8 is moved radially by a linear access motor 9.

Each curved segment 3 of the disk is accessible by designating the sector that contains it and the rank number C assigned to it in this sector. This rank number is the same for all curved segments in the same turn and changes by one unit on moving from one turn to the next along a particular radius. To cause the scanning light spot 7 to scan the turn with address C the motor 9 is actuated by an access control circuit 10. The access begins when the scanning light spot 7 is somewhere on the disk and ends in principle when the light spot has reached the destination address C. As a general rule the optical head stops moving before the light spot 7 is centered on the required track element, as microdisplacements of the light spot 7 are then obtained by a fine displacement motor operating on a beam deflector within the optical head 8, for example.

In this case the radial movement of the optical head represents a coarse phase of the access that has to be made as precise as possible in order to reduce the duration for which the fine access system functions to finalize positioning of the scanning light spot 7.

Figure 2:
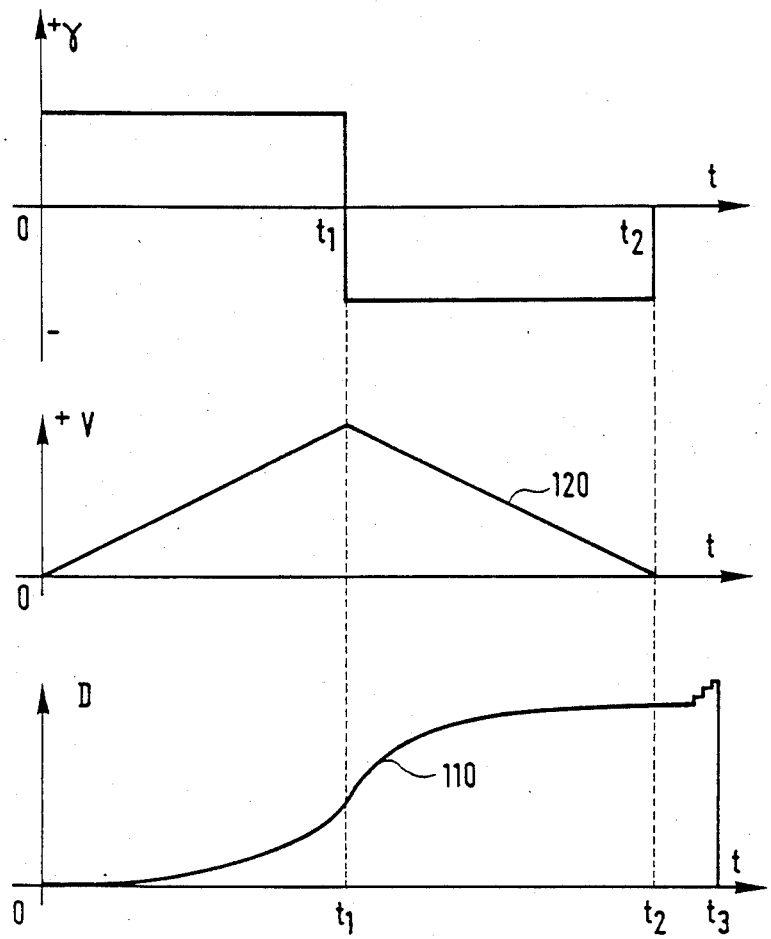
FIG. 2 is an explanatory diagram.

With reference to FIG. 2, the curve 110 represents the radial displacement D of the scanning light spot 7 between times 0 and $t_3$. The part of this curve between times $t_2$ and $t_3$ represents the fine approach employing small displacements in steps produced by the optical deflector in the optical head 8. The part of the curve extending from 0 to $t_2$ represents the coarse access. FIG. 2 also shows that, in order to obtain the law of displacement illustrated by the curve 110, provision is made for varying the radial speed V of the optical head according to the limiting curve 120 and that to obtain this limiting curve there is applied by means of the motor 9 a constant acceleration $\gamma$ from 0 to $t_1$ the sign of which is changed from $t_1$ to $t_2$. The displacement D as shown in FIG. 2 is the absolute displacement of the scanning light spot 7 obtained when the optical deflector in the optical head inoperative.

The control circuit 10 cannot achieve precise displacement by controlling acceleration and braking alone, since the resulting ballistic functioning would be subject to friction and spurious displacements. It is therefore advantageous to provide a device for measuring the displacement of the optical head with feedback to the access motor control system. In FIG. 1 this is achieved by means of optical sensors 11 and 12 which detect graduations 13 and 14 on an optical rule 15. The electrical signals produced by the sensors 11 and 12 are processed by the circuit 10 to produce a signal representing the amplitude and the sign of the displacement of the optical head 8. Circuits of this kind are well known but have two major disadvantages. One is that the graduations 13 and 14 have an increment P and are offset by one quarter this increment to indicate the sign of the displacement. The track elements on the disk have a different increment which cannot be kept in precise relationship to the increment of the rule. The other disadvantage is that the eccentricity of the disk creates relative displacement between the rule and the array of track elements.

To alleviate these disadvantages thought has been given to employing interaction of the scanning light spot with continuous grooves carried by the disk 1 to define by counting-downcounting the number of groove crossings caused by radii displacement of the scanning light spot.

To be more precise, when the disk is rotating the radial access results in a trajectory 16 which intersects the axes 3 of the writing on the reference surface 2. These intersections occur at the places marked with a dot on FIG. 1.

Figure 3:
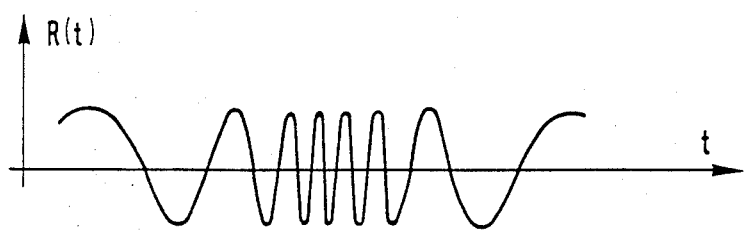
FIG. 3 shows an electrical read signal during scanning involving crossing tracks.

Assuming that the optical head analyses the light reflected from the illuminating part 7 of the reference surface 2 using a photo-electric cell situated on the optical axis of the objective lens which focusses the light spot 7 onto the disk, there is obtained an electrical signal R(t) as shown in FIG. 3. If the groove were optically lighter than the gaps between tracks the maxima of the signal R(t) would represent the times of crossing the grooves, which will be closer together for higher head displacement speeds. However, the signal R(t) is not sufficient for distinguishing a track crossing towards the outside edge of the disk from one towards the center.

A device for automatically accessing data stored in continuous grooves is described in French patent Application No 77 20373 filed July 1, 1977 in the name of THOMSON-BRANDT.

Figure 4:
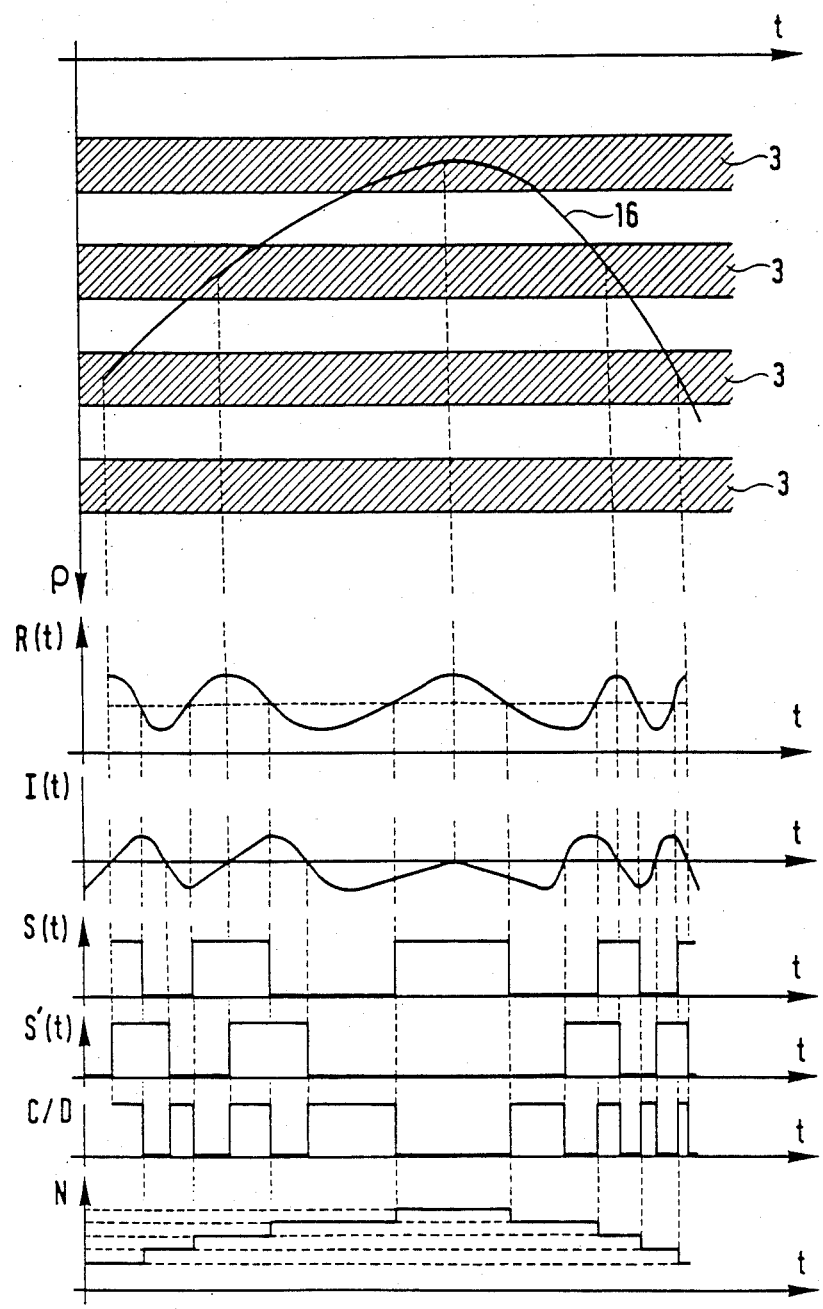
FIG. 4 illustrates a counting-downcounting technique based on crossing continuous track elements.

The essential functioning of this device is outlined in FIG. 4, the top of which shows related to a system of axes ($\rho$, t) a portion of disk with four equidistant grooves 3 and a trajectory 16 of the scanning light spot 7. The $\rho$ axis represents the centrifugal radial direction and the t axis represents the tangential direction or elapsed time, as these two variables are related to each other by the tangential scanning speed.

The R(t) diagram has the same meaning as in FIG. 3, but as it is a question of also defining the sense in which the grooves are crossed, an additional electrical signal I(t) is produced. To this end the optical head 8 comprises a second photosensing system with two contiguous cells the line separating which is situated on the optical axis of the objective lens. These cells are connected to complementary inputs of a differential amplifier which delivers the signal I(t). A threshold detector circuit converts the signal R(t) into a rectangular waveform S(t) and another threshold detector circuit switched at the zero crossing points derives the rectangular squarewave signal S'(t) from the signal I(t). A counter-downcounter circuit receives on a clock input pulses corresponding to each transition in the signal S(t), but its incrementing and decrementing are determined by an auxiliary signal C/D the logic states of which are those at the output of an exclusive-OR logic gate which receives on its two inputs the signals S(t) and S'(t). The indication N of the counter-downcounter changes as shown at the bottom of FIG. 4 and it will be seen that this faithfully reproduces the trajectory 4. The other specific features of the device described in the previously mentioned patent application are not used, but they are relevant, in particular with regard to updating of the counter on each turn in the case of a spiral track.

Returning to the compartmentalization of the disk as shown in FIG. 1, the sampling technique may be introduced, along with the corresponding prewritten pattern, by imagining that the reference surface 2 is a smooth surface reflecting light uniformly. It will then be realized that the track is sufficiently materialized by the presence in the immediate vicinity of the radii 6 of groups of prewritten patterns which alone interact with the scanning light spot 7.

Assuming that access control is based on prewritten information on the disk essentially limited to the radii 6, the knowledge of the trajectory 16 by the access device will be limited to the points where it intersects the radii 6. Shown by squares in FIG. 1, these points of intersection fall more often than not between the axes 3. Also, the light spot may have traversed track elements between two of these consecutive points without their presence having been revealed. The concept of sampling mode reading of a data storage medium does not require the presence of a groove or the recognition of segments reserved for writing the data. It is therefore entirely feasible for the blank, unwritten disk to comprise only prewritten patterns, although in all cases sampling mode access control must be feasible without optical interaction with the data to be stored and the underlying continuous grooves, if any.

Implementing a sampling mode access method in accordance with the present invention presupposes that there has been achieved with sufficient precision synchronism between a clock signal and the periodic encountering of a first family of N equi-angularly spaced radii. Such synchronism is achieved in a manner that is known in itself by means of synchronization flags forming part of the prewritten information on the disk.

The focussing of the light on the reference surface of the disk is also achieved by known means that there is no need to describe here.

Given the short-term nature of the samples acquired from the P radii of a sub-family assigned to sampling mode access control, it is essential for the photosensed electrical signals to be meaningful wherever the scanning light spot encounters the radii of this sub-family. In practice this condition implies that the specific patterns assigned to sampling mode access interact with the scanning light spot to generate a sensed signal whose value is predefined, that is to say differs from that obtained when the scanning light spot encounters an entirely smooth portion of the reference surface. It is clear that when a pattern is larger than the scanning light spot only interaction at the edge can establish this distinction, unless the contrast between the pattern and its surroundings is due to a cause other than modifying the wave surface of the light to be sensed. An abnormally large space between patterns could yield an undefined value for the instantaneous position of the scanning light spot.

In the case of sampling mode access it is necessary to provide on the reference surface of the disk radial graduation means related to the arrangement of the axes 3 and elements of such graduation means may occupy a group of radii sampled in succession. This is one advantage of this method since in the case of a solution using continuous grooves only a single and extremely rudimentary law of graduation may be employed.

With regard to the concept of graduation, two levels of integration may be envisaged. The more elementary level consists in reproducing along one radius of the disk a periodic scale, with a periodic scale of the same general kind along a very near radius but offset in phase-quadrature so as to give an indication of the direction of displacement along this double scale. A single scale may be sufficient if the second scale is derived by photosensing means which interpret differentially the light to be sensed. The choice of adjacent radii for sampling the functions in phase quadrature results from the fact that if the trajectory does not intersect these radii at right angles a slight radial offset is introduced which tends to degrade the phase quadrature relationship.

A more sophisticated level of integration consists in providing a non-periodic scale assigning an absolute value to each position along the radius. In this case, the scale is expressed in a coded address which takes up more room but that can be read less frequently on scanning a turn. These two levels of integration may coexist, as will be seen in the remainder of this description.

Figure 5:
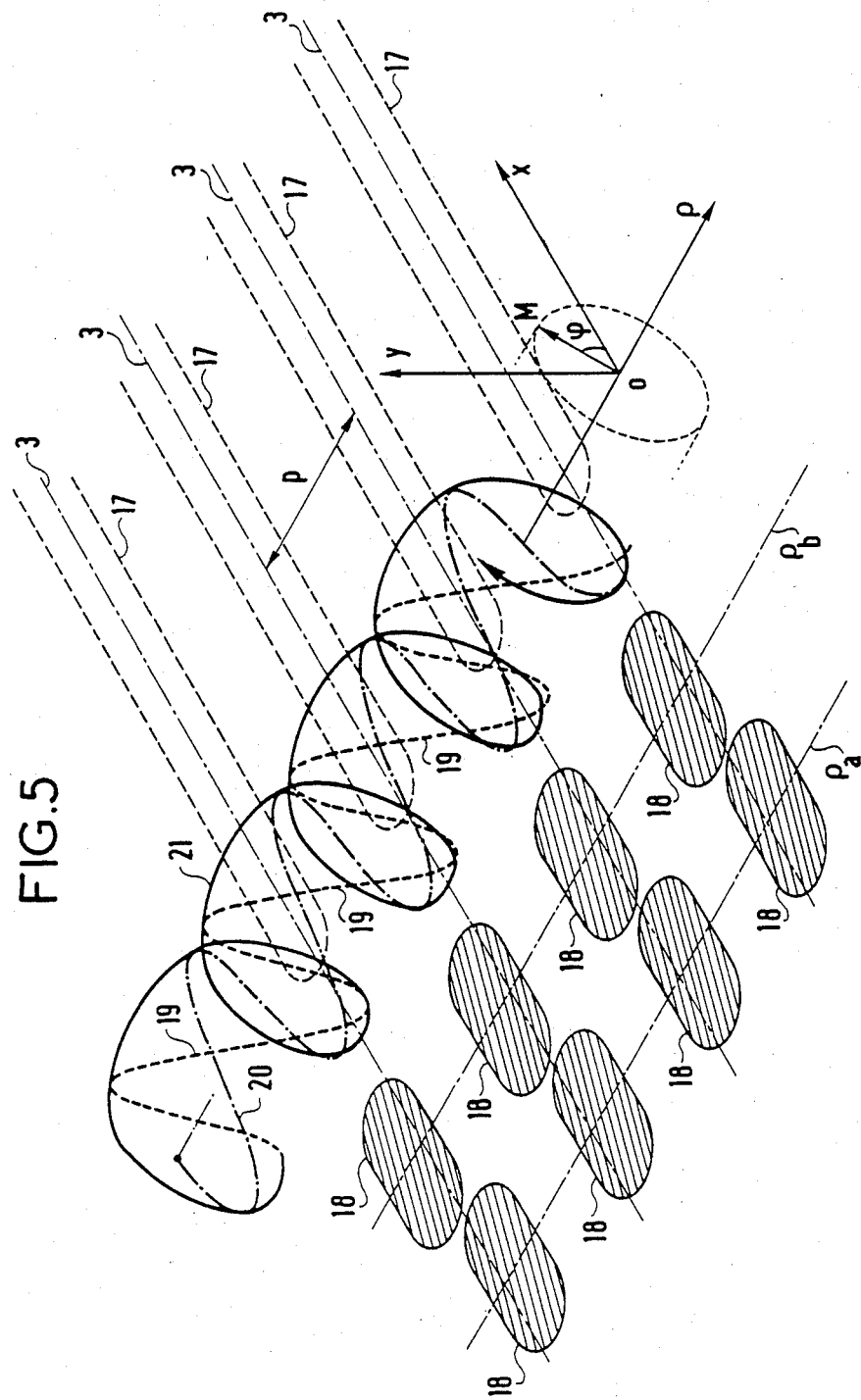
FIG. 5 is a partial isometric view of a disk using prewritten patterns adapted to sampling mode access.

FIG. 5 is an isometric view of a fragment of the reference surface 2 of the disk from FIG. 1 related to a system of axes x, y, $\rho$. The radius $\rho$ and the x axis define the reference surface and the y axis is parallel to the rotation axis 4 of the disk. Data areas 17 are traced out with a dashed contour centered on the axis 3 of a plurality of adjacent track elements. These areas 17 extend from the radius $\rho$ in the scanning direction x and are preceded by prewritten patterns 18 which form two radial alignments on sampling radii $\rho_a$ and $\rho_b$. The radial arrangement of the patterns 18 centered on the radius $\rho_a$ is such that interaction with the scanning light spot 7 generates an electrical read signal represented by the cosinusoid 19 drawn on the plane (y, $\rho$). The similar but phase quatrature offset radial arrangement of the patterns 18 centered on the radius $\rho_b$ is such that interaction with the scanning light spot 7 generates an electrical read signal represented by the sinusoid 20 drawn on the plane (x, $\rho$). The two circular functions 19 and 20 can represent the components of a vector the projection of which in the (x, y) plane is OM. This vector represents completely the progress of the scanning light spot along the radius $\rho$ and its end traces out a helix 21 which symbolizes a graduation scale comparable to that obtained from the rotation of a screw. This illustration of the possibilities conferred by the patterns 18 of transcribing the displacement of the light spot into rotation of the vector OM shows clearly that knowing the angle $\phi$ of the vector OM defined in the range 0–360° does not provide an absolute indication of the position $\Phi$, of which $\phi$ would be only the fractional part. The patterns 18 in FIG. 5 provide for reliable counting-downcounting of the tracks provided that the signal is sampled at time intervals that are sufficiently close together to track the continuity of the advance. The advantage of the configuration shown in FIG. 5 is that it occupies little space along the track elements because it is sufficient to effect two iterative samplings to acquire the information relating to the track crossings. The disadvantage of this solution is its use of a doubt resolving process since between two successive samplings the speed of radial translation may be such that the variation in $\Phi$ corresponds to more than one revolution of the representative vector OM.

A specific advantage of the solution shown in FIG. 5 is that the patterns 18 may be used to achieve sampling mode access and also to procure following of a track element. As FIG. 5 shows, the patterns 18 centered on the radius $\rho_a$ have a positive offset relative to the axis 3 whereas the patterns 18 centered on the radius $\rho_b$ have a negative offset of the same amplitude. It is seen that if this arrangement is chosen with the offset equal to one eigth of the increment p of the track elements then the samples acquired along the radii $\rho_a$ and $\rho_b$ are precisely those needed to determine the distance between the center of the scanning light spot 7 and the axis 3 of the track element being scanned.

Figure 6:
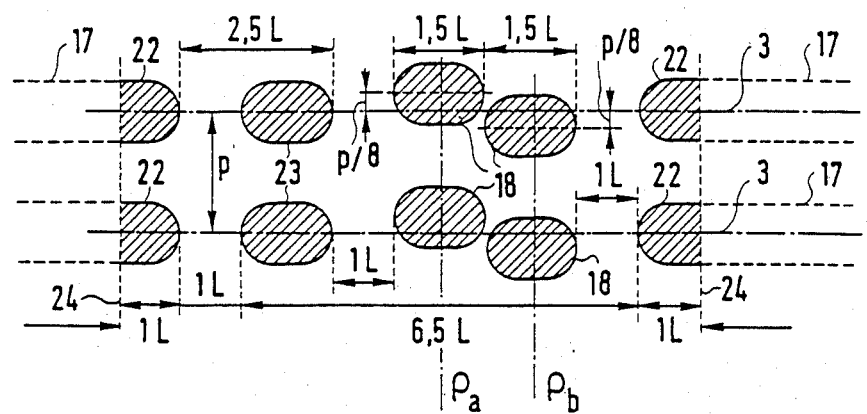
FIG. 6 shows a first embodiment of prewritten information in accordance with the invention.

A configuration of prewritten patterns suited to this double utilization of the patterns 18 is shown in FIG. 6.

The FIG. shows the axis 3 of two track elements and the data storage area 17. The prewritten information is shown shaded in FIG. 6, lying between the boundaries 24 which lie on either side of the patterns used to achieve synchronization by sampling, track following and access by counting-downcounting.

The patterns 18 are shown as in FIG. 5 with a length as measured in the scanning direction equal to one and a half times the length L chosen as the transcription unit. The centered pattern 23 has the same length as the patterns 18 and serves, in association with the terminal patterns 22, to synchronize the rate at which the track is scanned. To this end two specific distances 2.5 L and 6.5 L are adopted of the patterns 22 and 23 can be identified relative to all other transitions that the read signal may contain. Sampling along the radii $\rho_a$ and $\rho_b$ is conditioned by a clock signal synchronization of which depends on appropriate scanning of the patterns 22 and 23 during the access phase and during the next phase in which the light spot is again constrained to follow the track element to which access has been made.

Figure 7:
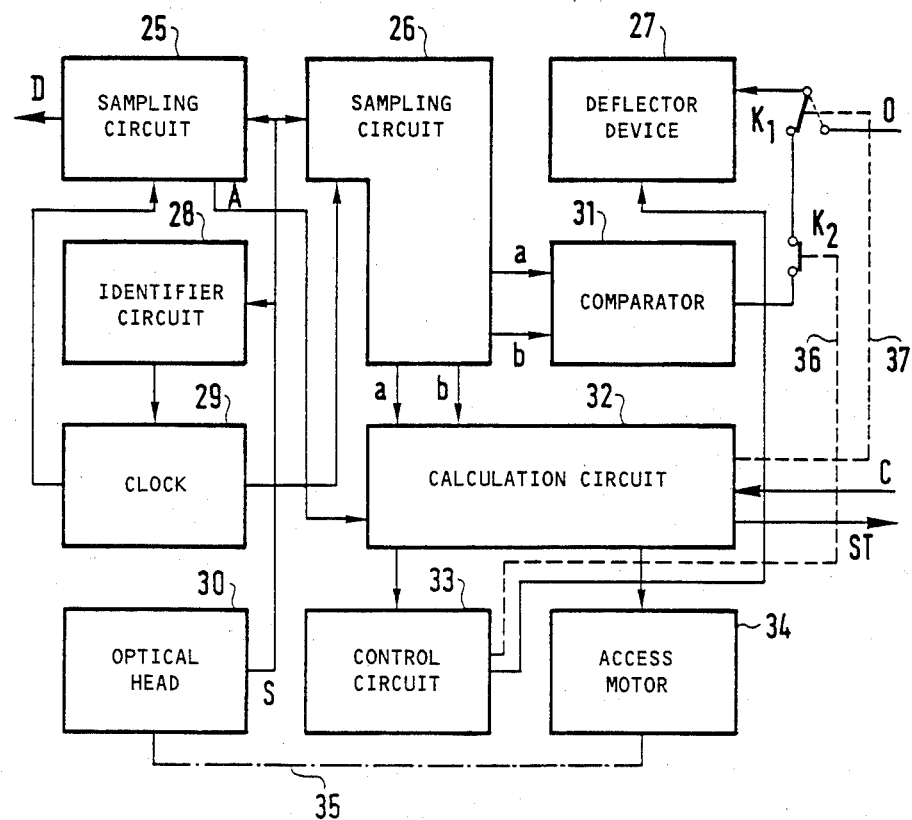
FIG. 7 is a block schematic of an optical scanning device in accordance with the invention.

FIG. 7 is a block diagram of a sampling mode access scanning device. The electrical signal S produced by scanning the disk 1 with the light spot 7 is delivered by the optical head 30 to an identifier circuit 28 which recognizes the arrangement of the patterns 22 and 23 and outputs a signal for synchronizing the clock 29. The signal S is also applied to a sampling circuit 25 which is controlled by the clock 29 and isolates the data D written into the data area 17 and a specific address A of the track element being scanned.

The signal S is also fed to another sampling circuit 26 also controlled by the clock 29 and acquiring the samples a and b which correspond to encountering the radii $\rho_a$ and $\rho_b$. These samples are presented in digitized form to the input of a calculation circuit 32 which controls the access and in analogue form to the input of a memory-equipped comparator circuit 31 which, in the known manner, determines the radial distance of the scanning light spot 7 from the track element 3. A deflector device 27 for the scanning light spot is integrated into the optical head 30 to finalize an access by skipping tracks as shown in FIG. 2. Track skipping is controlled by a control circuit 33 which receives from the calculation circuit 32 the track skipping instructions needed for the final approach to the set point value C fed into the calculation circuit 32. When the scanning light spot has just read the track element designated by the set point C, the calculation circuit outputs a signal ST indicating completion of the access. Outside access periods the radial distance signal produced by the circuit 31 is transmitted through two switches $K_1$ and $K_2$ to the deflector device 27 so that the read light spot 7 is constrained to follow the track. The switch $K_2$ is temporarily opened on each track skip commanded by the circuit 33 (hence the dashed line 36 connecting these two circuits). During the coarse access phase the switch $K_1$ connects the deflector device 27 to a control line 0 which locks it in neutral position. This neutralization is indicated in FIG. 7 by the dashed connecting line 37. The coarse access phase is controlled by the calucation circuit 32 which receives the digitalized samples a and b and which, on the basis of the start address A and the destination set point C, defines the control signals to be applied to the access motor 34. This moves the optical head, as symbolized by the chain-dotted line 35, so as to traverse the track elements that separate the start point from the destination point. To give an example, a disk with a diameter of 300 mm carrying a spiral track with 30,000 turns at a pitch of 1.6 μm and rotating at 1,200 revolutions per minute would be sampled at a frequency of 50 kHz, representing 2,500 pairs of patterns 18 per disk revolution. Thus with the arrangement of the prewritten patterns as shown in FIG. 6 and taking an average value of one micron for the length L, the amount of a turn taken up by the pre-written information would not exceed 23.75 millimeters, which is small in comparison with the length of the turn.

Now that an overview has been given of a first embodiment of the invention it is necessary to describe in more detail now the calculation circuit 32 processes of the samples a and b.

FIG. 5 shows that there generally exists during an access a function $\Phi(t)$ which represents the absolute position of a mobile member as a function of time. This function is synthesized to a more or less accurate degree from a limited number of prewritten patterns and its evolution is subject to mechanical laws as shown in FIG. 2.

Figure 8:
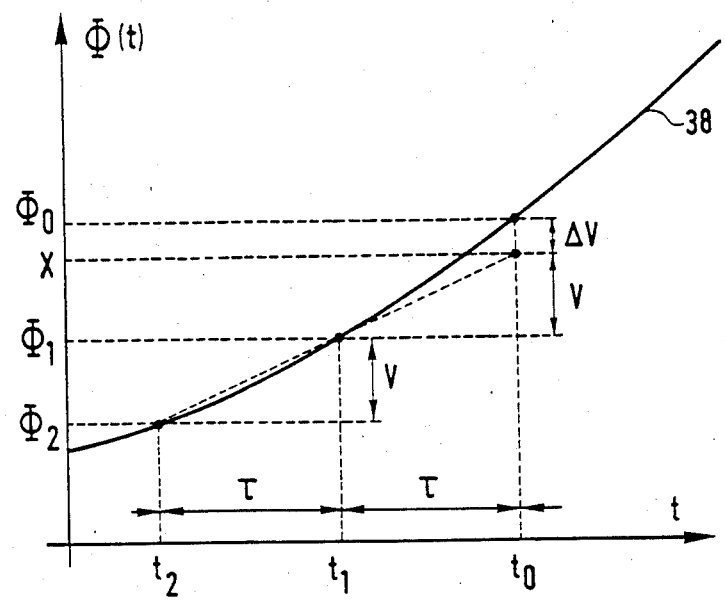
FIG. 8 is an explanatory diagram.

Referring to the diagram in FIG. 8, it is seen that the law $\Phi(t)$ shown by a curve in full line is sampled at times $t_2$, $t_1$ and $t_0$, the period $\tau$ being conveniently chosen as the time unit. This law gives the measure of an angle when the interpretation of FIG. 5 is adopted in which the rotation of the vector OM is associated with the radial displacment of the read head. If $\Phi_2$ and $\Phi_1$ are the absolute values of the rotation of the vector at the sampling time $t_2$ and $t_1$ and if these values were obtained on the basis of the initial conditions for the access and by digital iterative processing, it is seen that the displacement speed V between these times is simply expressed by the difference between $\Phi_1$ and $\Phi_2$.

At the time $t = t_0$ of the last sampling the problem that arises is to determine $\Phi_0$ given that $\phi_0 = \text{MOD}[\Phi_0, 2\pi]$. The symbol MOD represents the modulo function which provides the remainder $\phi_0$ of dividing $\Phi_0$ by $2\pi$. FIG. 8 shows that the speed at time $t_0$ is still V if the linear extrapolation is valid and thus if the mobile member has not been subjected to any acceleration $\gamma$, but as this acceleration is given precisely by $\gamma = \Delta V$, the value at time $t_0$ is actually $\Phi_0$ and not the linearly extrapolated value X.

The following equations are therefore available:

$$V = \Phi_1 - \Phi_2;\ X = \Phi_1 + V;\ \Delta V = \Phi_0 - X$$

from which is derived: $\Phi_0 = X + \Delta V$

Denoting $m(u) = \text{MOD}[u + \pi, 2\pi] - \pi$ and imposing the condition: $-\pi < \Delta V < +\pi$, it is seen that:

$$\Delta V = m(\phi_0 X)$$

from which it follows that:

$$\Phi_0 = X + m(\phi_0 - X)$$

This equation shows that with the hypothesis adopted, that is to say by validating a test and for accelerations as encountered in practice, it is a simple matter to update $\Phi_0$ with the sample $\phi_0$ and the linear extrapolation which gives the value X.

The foregoing mathematical study shows that sampling mode access based on synthesizing a periodic function can supply the absolute position of a mobile member and resolve the ambiguity of the modulo function by means of an iterative processing of the remainders on dividing by $2\pi$.

Figure 9:
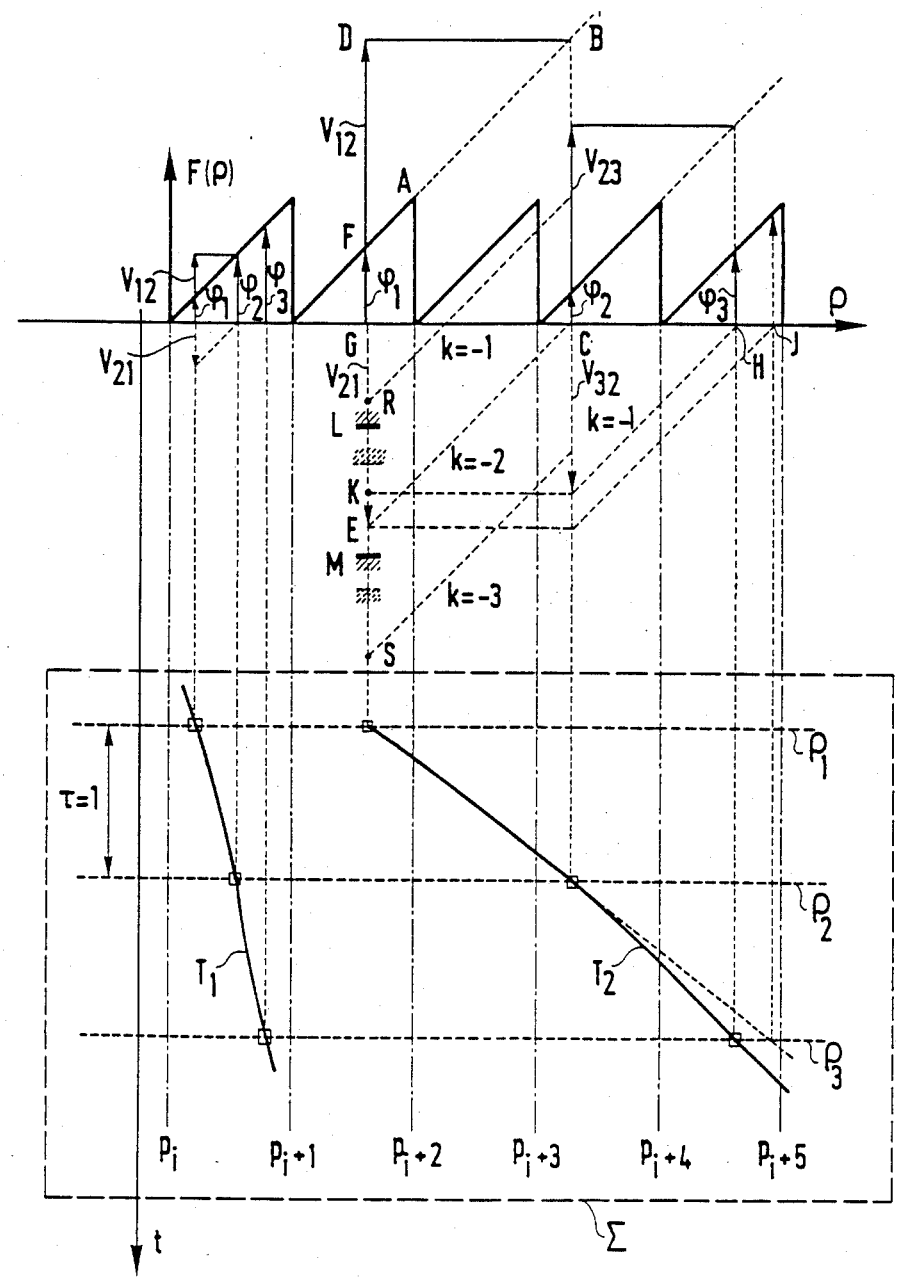
FIG. 9 illustrates the functioning of an optical scanning device based on sampling mode access.

Although the invention is not limited to the use of purely periodic radial functions and regular sampling, this type of functioning is specifically shown in FIG. 9, which attempts to make the best possible match with the presentation of FIG. 4.

It is assumed, in agreement with FIG. 5, that by virtue of an appropriate choice of dimensions and radial spacing the patterns 18 of FIG. 6 generate circular functions when they are scanned along the radii $\rho_a$ and $\rho_b$ by a read light spot whose diameter is matched to the radial width of the patterns and to the interstices between patterns. A variation of this kind is readily obtained in practice with an accuracy of a few percent. A trigonometrical calculation based on the arctangent function yields a sampled law of the assymetrical sawtooth type.

FIG. 9 shows part of a surface $\Sigma$ in a system of axes $(\rho, t)$. This portion comprises radii $\rho_1$, $\rho_2$ and $\rho_3$ along which are effected sampling according to a sawtooth function $F(\rho)$ for which the positive values $\phi_1$, $\phi_2$, $\phi_3$ are samples.

The trajectory $T_1$ shows a low-speed access. When it is travelled towards the right it is seen that the scanning speed $V_12$ is obtained by subtracting the sample $\phi_2$ acquired last from the preceding sample $\phi_1$. This subtraction is shown in the FIG. by a horizontal translation of the vector $\phi_2$ on the line of action of the vector $\phi_1$. Provided that the trajectory does not intersect any track axis it is sufficient to apply the equation $V_{ij}=\phi_j-\phi_i$. If the trajectory is travelled in the opposite direction, the most recent sample is $\phi_1$ and the speed $V_{21}$ is obtained by applying the equation $V_{ji}=\phi_1-\phi_j$ which gives a negative result showing that movement is to the left. Respecting the organization in time of the samples, these equations are equivalent to each other and would be applicable even if a track were crossed if the function $F(\rho)$ were a simple obliquie straight line in the system of axes $\rho,F(\rho)$. The periodic nature of the function $F(\rho)$ makes the speed calculation more difficult.

To illustrate this there is shown another trajectory $T_1$ in the same FIG. which, when it is travelled from left to right, results in two track crossings followed by a single track crossing.

Consider again three sampled values $\phi_1$, $\phi_2$ and $\phi_3$, this time not situated on the same sawtooth function $F(\rho)$. The correct determination of the speeds $V_{12}$ and $V_{21}$ will be based on the dashed line extension AB of the slope which contains $\phi_1$. Substituting for the sample $\phi_2$ the value corresponding to the measured BC, it is possible to construct graphically the speeds $V_{12}$ and $V_{21}$ by extending the horizontal line BD and the oblique line CE. The problem is to determine BC given $\phi_2$. If the domain of variation of the function $F(\rho)$ is the interval $(0, 2\pi)$, it is seen that BC is equal to $\phi_2$ increased by $2k\pi$ where $k=+2$ signifies that two track crossings have occurred between the sample $\phi_1$ and the sample $\phi_2$.

On further consideration of FIG. 9 it is seen that the determination of the speeds $V_{23}$ and $V_{32}$ from the samples $\phi_2$ and $\phi_3$ implies another value of k since only one track crossing occurs between these two samples.

Since by definition sampling mode access ignores events occurring between two samples, it is necessary to synthesize a variable k for which the integer values $-n, \ldots -2, -1, 0, 1, 2, \ldots +n$, validated according to an appropriate criterion, represent the track crossings algebraically. The sign of the variable k indicates the direction of the crossing such that a track crossing count variable n can be updated on each new sample acquired by means of the operation: $N=N+k$.

The criterion for validating the variable k is related to the ability to change the speed a trajectory is traced on the disk. In practice this ability is limited by the acceleration that the access motor can communicate to the optical head. The eccentricity characterizing rotation of the disk results in an oscillation of the trajectory, but this is merely a secondary effect that has been ignored in tracing the trajectory.

In FIG. 9 the trajectory $T_2$ is a broken line showing a radial advance GC of duration $\tau$ distinct from the radial advance CH of the same duration which precedes or follows it. For a movement of the optical head from left to right it may be said that the head has been subjected to a deceleration $\gamma=HJ$, where J is the position that would be reached on the radius $\rho_3$ if the deceleration had not occurred.

To give a non-limiting example, it will be assumed that the trajectory $T_2$ is traced from right to left and that the criterion for validating the variable k is based on comparing speed estimates using the values $\phi_3$ and $\phi_2$ and then the values $\phi_1$ and $\phi_2$. FIG. 9 shows that the determination of the speed $V_{32}$ is based on a knowledge of $\phi_3$ and $\phi_2$, and on the value $k=-1$ that has been validated previously. To relate this determination to that supplying the speed $V_{21}$, there has been projected onto the vertical line carrying the vector $V_{21}$ the length GK which represents the previously calculated value $V_{32}$, that is to say $\phi_2-\phi_3-2\pi$.

There is symbolically represented around the point K an interval encompassing limits L and M such that $GL=V_{32}+\pi$ and $GM=V_{32}\pi$, where $\pi$ is the half-height of the sawtooth $F(\rho)$. The end E of the $V_{21}$ speed vector determined by assigning the value $-2$ to the variable k lies in the interval LM, which constitutes its validation test. On the other hand, the values of $V_{21}$ obtained from $\phi_2$, $\phi_1$ and the choice of another value for k lie outside the interval LM. In FIG. 9 the points R and S obtained by graphical construction offset by $+2\pi$ are characteristic of speed calculations respectively using the values $k=-1$ and $k=-3$. It is thus seen that non-realization of the test indicates that it is necessary to modify the variable k on proceeding from the calculation of $V_{32}$ to the calculation of $V_{21}$. The size and sense of the change in the variable k depend on the trajectory and on the direction of movement, but starting from the previously validated value it can be incremented by unity repeatedly until the test is validated. The choice of the interval $+\pi$ has the result that only one value of k can be validated. This being so, the correct determination of k is founded on an assumed moderate variation in the speed. This aspect is shown in FIG. 9 by a dashed line modification to the trajectory $T_2$ and by a graphical construction showing the recentering of the interval LM relative to the point E. This diagram shows that KE is the acceleration and that the value $\pi$ must not be exceeded for the value k validated by the test to correspond to reality.

Given the foregoing, the process for determining the variable k may be represented by the flowchart of FIG. 10, the variables in which are as follows:
the indication N of a track crossing counter,
the speed V,
the crossing quantum : k,
the speed difference $\Delta v$,
the input values $a_i$, $b_i$,
the angle $\phi$,
the angle $\phi_{-1}$ corresponding to the previous sample.

This flowchart is a module intended to be integrated into a more general, and also conventional, flowchart which is used to control an access from a set point C by controlling one or more motors adapted to produce coincidence of the read light spot 7 with a track element 3 to which this set point relates. The variables are reproduced at the bottom of FIG. 10. The flowchart comprises the input of the digitized samples $a_i$ and $b_i$ which are acquired at regular intervals $\tau$. These values are assigned to the variables a and b used to update the variable $\phi$ by means of a correspondence table or a trigonometrical calculation. The variables $\phi_{-1}$ and $\phi$ and the variable k validated on a previous calculation used to determine the speed variation $\Delta V$ are used for the first test $-\pi<\Delta V<+\pi$. In the event of validation this test initiates updating of the variables V, N and $\phi_{-1}$. Once the updating has been done, there is a return to the general access flowchart. If the test is not validated it is assumed that the variable k has to be incremented or decremented by unity, the choice being determined by a second test $\Delta V>0$ which leads to two loops that can function recursively until the first test is validated. It goes without saying that this flowchart can be adapted to take into account a large number of samples to guard against read errors.

The test is characterized by fixed boundaries $+\pi$ and $-\pi$ but these boundaries could be moved according to accelerations encountered during the access. The updating of the speed V is optional, although it is useful to know it in connection with the stability of the radial control function and the determination of a false curvature.

This flowchart does not include the initialization operations as they are governed by the main flowchart. They consist in assigning a null value to the variables V and k when an access is undertaken. The variable N may be assigned to value $N_0$ which defines the start position on opening the track following loop.

In the preceeding explanation it has been assumed that the scales sampled along radii of the disk were respectively sinusoidal and cosinusoidal.

In this case the values of the function $F(\rho)$ are deduced from the pairs of samples $(a_i, b_i)$ by the operation $\phi = \arctan b/a$. It goes without saying that the radial arrangement of the patterns assigned to radial location of the scanning light spot can generate periodic laws differing from a circular function which does not prevent the obtaining of a sawtooth function $F(\rho)$ if there is adopted in order to determine the values an appropriate rule of correspondence defined by means of a table, for example.

Figure 11:
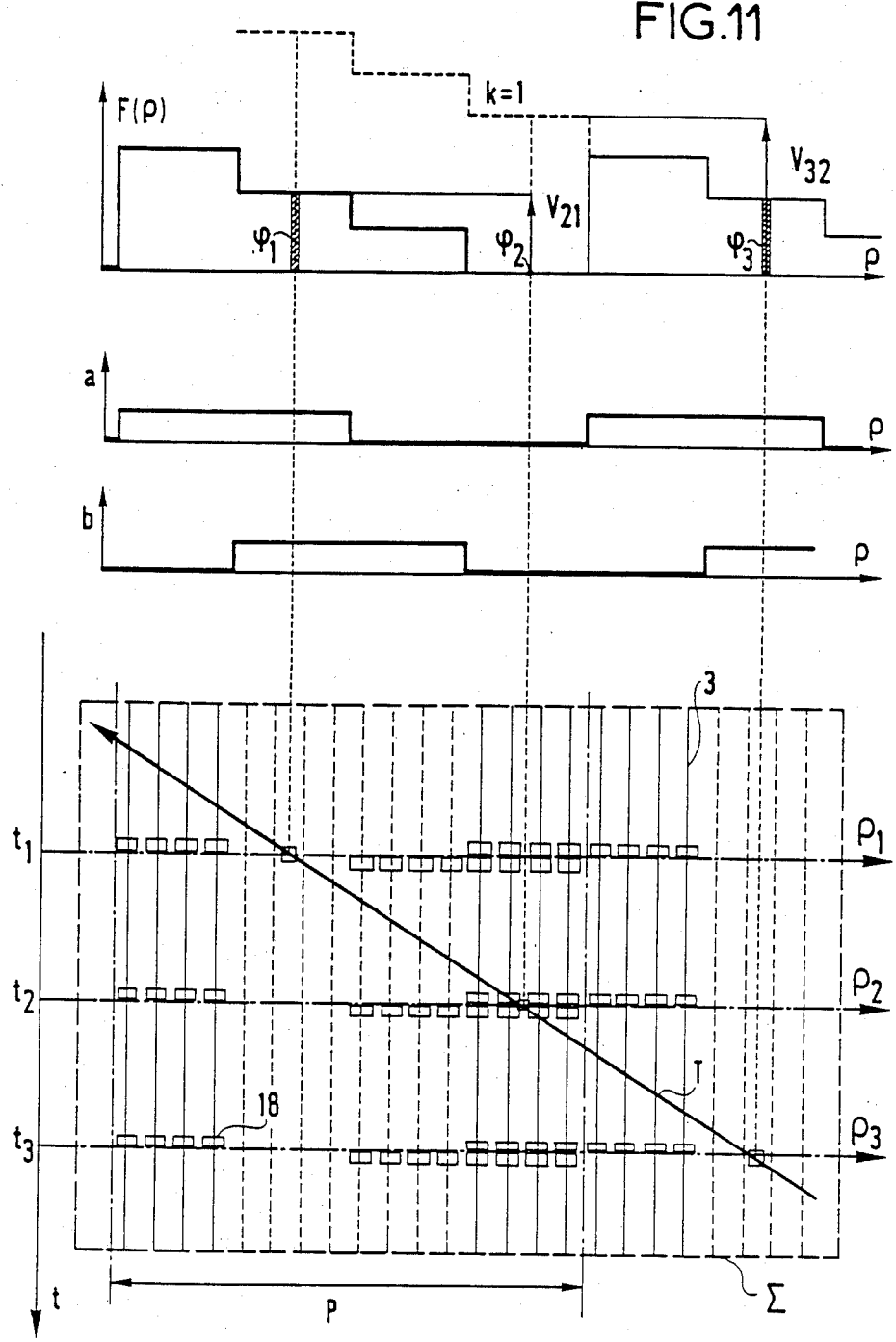
FIG. 11 explains the functioning of an optical scanning device based on access by packets of track elements.

The use of a staircase periodic function $F(\rho)$ is also within the scope of the present invention. FIG. 11 shows by non-limiting example one counting-down-counting process based on the materialization of a staircase function.

This FIG. is related to FIG. 10 and shows a portion of disk $\Sigma$ with three radii $\rho_1$, $\rho_2$ and $\rho_3$ along which are arranged prewritten patterns.

A set of equidistant track elements is traced perpendicularly to the radii $\rho_1$, $\rho_2$ and $\rho_3$. The track elements are grouped in packets of 16 that are made more easily visible in FIG. 11 by tracking in full line the four end elements and in dashed line the central elements. It is thus seen that a packet of step P is made up of four sets of four elements that are distinguishable from each other by combinations of patterns extending to either side of the radii $\rho_1$, $\rho_2$, $\rho_3$. The patterns used are, for example, centered on the track elements and arranged along each radius $\rho_1$, $\rho_2$ and $\rho_3$ in such a way that there are encountered from the left four upper patterns identifying the first set of four elements, then a total absence of patterns indicating the second set of four elements, then four lower patterns identifying the third set of four elements and, finally, four upper patterns and four lower patterns to code the fourth set of four elements. A string of patterns must have dimensions such that the corresponding read signal is at a lower level than the level obtained on scanning a smooth area.

By isolating this latter level using a threshold circuit, scanning along the radius $\rho_1$ of the top row of patterns produces the waveform $b(\rho)$ shown in the figure whereas scanning the bottom row of patterns produces the waveform $a(\rho)$. The waveform $F(\rho)$ takes the form shown in FIG. 11 when it is deduced from the waveforms $a(\rho)$ and $b(\rho)$ as per the table below:

| a | b | c |
|---|---|---|
| 1 | 0 | 270° |
| 1 | 1 | 180° |
| 0 | 1 | 90° |
| 0 | 0 | 0° |

The values of F are chosen to represent the concept of a quarter-turn expressed in degrees on passing over a set of four tracks.

FIG. 11 shows a trajectory T scanned from right to left and successively encountering radii $\rho_3$, $\rho_2$ and $\rho_1$ at sampling times $t_3$, $t_2$ and $t_1$. There are thus obtained samples $\phi_3$ and $\phi_2$ used to assign a value $V_{32}$ to the speed of traversing packets of track elements.

The determination method is not essentially different from the method previously described, and in particular due account is taken of the fact that the packet boundary (vertical chain-dotted line) has been crossed between the times $t_3$ and $t_2$, this being linked to the value of the variable k which is $+1$ in this case. This is shown by the dashed extension to the staircase function. Using the samples $\phi_2$ and the $\phi_1$, a new determination of the speed $V_{21}$ is carried out, corresponding to the value $K=0$, which indicates that the scanning between the time $t_2$ and $T_1$ is entirely inside the packet without encountering any boundary.

Although this is not shown in FIG. 11, the patterns can have a length greater than the dimensions of the read light spot in the direction of the track elements. When an arrangement of this kind is adopted there may be some difficulty in recognizing the pattern in its environment.

It is as well to specify here that sampling a pattern generally employs a sampling window that is wider or narrower than the portion of signal which represents the scanning of the pattern by the read light spot. When the window is narrow, it is assumed that the level sampled is distinct from the level representing the scanning of an area with no patterns.

On the other hand, if the window is wide as compared with the pattern the signal sampled contains a pair of transient level variations which mark the light spot encountering the leading and trailing edges of the pattern. On remarking these two variations within the window, it may be concluded that a pattern is present, even if the level transmitted in the middle of the window has remained equal to that characterizing a blank area of the disk. To recognize the presence of two successive patterns it is necessary to provide two offset sampling windows to encompass complete interaction with each pattern. When the two patterns follow on without a sufficient interval between them, only the outside edges are recognized and the variations in level normally assigned to a pattern are not simultaneously present within the same window, so that it is possible to conclude that there are two coexisting patterns. It is therefore possible to distinguish the four cases that can arise in order to create the radial graduation scale.

In the embodiments that have been described use has been made of two alignments of patterns encountered successively by the scanning light spot 7 with a view to obtaining two periodic radial laws in phase quadrature which define a graduation scale.

As these laws are exploited by means of sampling, it proves necessary to use a recursive method to define an access absolutely. The updating of a digital variable during the access procedure is equivalent to an operation to count the track crossings.

It is possible to move away from this type of functioning by reducing the number of laws to be provided around each radius, which amounts, for example, to reading a single law using within the optical head a photosensor system with a central cell and a photosensor system with two half-cells. In this case the patterns creating the single periodic law give rise to two signals in phase quadrature and they may be centered on the track axis 3.

To occupy minimum space in the track scanning direction, it has already been shown that the radial graduation scale can employ the width of the patterns and their separation to generate samples capable of assuming numerous distinct values from one track axis to the next. If the patterns feature shape anomalies it is prudent to provide an algorithm for processing the samples which extends over three of four successive acquisitions so that extrapolation can be applied with any abnormal values acquired set aside.

FIG. 11 shows that without taking up too much time counting-downcounting at packet level makes it possible to adopt a two-element law for coding levels of a staircase periodic function. This solution is less vulnerable to defects in the patterns and will even make it possible to replace strings of patterns by radial bands of greater or lesser width in the track scanning direction.

By accepting the use of more space and therefore the need to take more samples around each specific radius, the graduation scale can be made more detailed and, in the final analysis, the sampled access process simplified by adopting the concept of "on the fly" absolute address reading.

FIG. 12 shows a staircase graduation function $F(\rho)$. The full line curve 40 defines a find graduation scale whereas the dashed line curve 41 defines another graduation scale with only one quarter the resolution. It is seen that the fine scale 40 adds three levels to each step of the coarser scale which introduces a three-step periodic differential scale resembling in all respects that of FIG. 11. Note that the curves 40 and 41 represent regularly increasing functions which make it possible to read the absolute radial position $\rho$ on the disk.

The lower part of FIG. 2 shows a portion of the reference surface 2 of the disk 1. The vertical lines represent the inter-track axes. Two sampling radii $\rho_1$ and $\rho_2$ are placed horizontally at a distance for which the time equivalent is one sampling period $\tau$.

To materialize the radial graduation scale on the disk use is made of two prewritten patterns 42 which are distributed on equidistant radii grouped around the radii $\rho_1$ and $\rho_2$. In FIG. 12 five of these radii are defined by the lines of patterns 42 parallel to the radii $\rho_1$ and $\rho_2$.

The patterns 42 are placed on these lines according to a specific code that is reproduced in the middle part of FIG. 2. The code comprises in each column related to a track an address on fiv bits. This address is materialized in the bottom part of FIG. 12, where an absent pattern 42 represents the binary value "0" and a pattern 42 that is present represents the binary value "1". Each complete address on five bits designates a value of the staircase function 40. The dashed line box 43 contains the address parts formed by the three more significant bits which define the values of the staircase function 41. The two less significant bits form address parts which represent the values of the periodic function used to convert the curve 41 into the curve 40.

The coding as shown in FIG. 12 is specifically chosen so that the addresses contained in two contiguous columns differ from each other only by having one bit inverted. To be more precise, this is a reflected binary code that can be constructed by writing into the top row a module "01" that is repeated from left to right, reversing it on each repetition. The next row uses the same procedure for a module "0011", and so on. To determine the value of $F(\rho)$ from an address on n+1 bits respectively denoted $a_n, a_{n-1} \ldots, a_j \ldots, a_2, a_1, a_0$, the following equation is used:

$$F(\rho) = \sum_{k=n}^{k=0} 2^k \cdot \sum_{j=n}^{j=k} a_j$$

Figure 13:
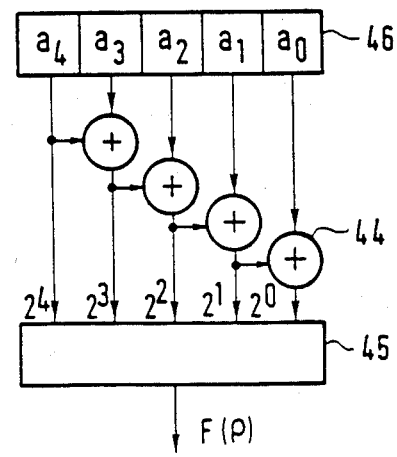
FIG. 13 shows a decoding circuit.

This equation is representted in FIG. 13 for an address on five bits. Binary adders 44 each receive a bit value contained in the address 46 and add it to the sum of the more significant bit values. The results which appear at the various outputs of the adders 44 are assigned the weights indicated in the FIG. and are added by the circuit 45 which delivers the appropriate value of $F(\rho)$.

One advantage of the solution shown in FIG. 12 resides in the fact that going from one track element to the next changes only one bit in the complete address. Referring to the trajectory T shown in FIG. 12, it is seen that the scanning light spot 7 encounters the sampling radius $\rho_1$ straddling two track elements 17. The read address resulting from this scanning phase is shown by the box 46 in the $F(\rho)$, $\rho$ diagram but the less significant bits are not readable in a stable way, since a slight shift in the trajectory is sufficient to cause one of these bits to be interpreted differently. This sampling could equally well designate the box 47 or the box 48, which has little influence on the value of $F(\rho)$. It has already been seen that the less significant bits generate a periodic fine graduation scale for which it has been shown that the processing of samples makes it possible to obtain an absolute indication relating to the access. It is also seen in FIG. 12 that the address part comprising the more significant bits is stable for small movements of the trajectory. Through this address part there is obtained in a coarser way the concept of absolute displacement since it represents a staircase monotonous funciton. Similar conclusions are arrived at from considering how the trajectory T encounters the sampling radius $\rho_2$.

The previous explanation shows that by assigning to each track element an address in reflected binary code there are obtained absolute graduations in steps that are progressively more refined as progressively fewer of the less significant bits are neglected in these addresses. Thus, using the same addresses, the periodic graduations available are more detailed over an increased period as fewer more significant bits are neglected. These two approaches may be combined in any relative proportions according to how the access characteristics change. The use of prewritten patterns defining an absolute addressing of the track elements uses up more space on the disk.

A first choice consists in providing on one complete revolution of the disk a restricted number of sampling radii each comprising a complete address on 15 bits sampled 250 time per revolution. This address can be read in full when the access speed is moderate, that is to say at the beginning and at the end of an access. Partial reading of the address during the access may serve to determine functioning conditions for the access motor.

A second choice is to provide on the track element one part of the complete address at closer intervals than the remaining part of the address, which makes is necessary to provide at least two sampling rates. For example, a closer arrangement of the partial addresses formed by the less significant bits may be chosen so as to obtain a periodic graduation function applicable throughout the duration of the access; the partial addresses formed by the more significant bits are more loosely arranged so that access can be finalized with complete knowledge of the address.

The alternate solution is also feasible when it is a question of achieveing control over access with stable and frequent reading of the more significant bits of the complete address, a final read becoming asymptotically complete as a result of the decreasing traverse speed.

In the final analysis, there is no fundamental difference between graduation based on periodic functions in phase quadrature and graduation based on the presence of absolute addresses in reflected binary code.

In the foregoing description it has been seen that synthesizing a radial graduation could be based on the radial dimensions of a specific patterns without attaching any specific importance to their extent along the track elements. An absolute address may be accommodated in a sequence of bit cells the content of which is acquired more or less completely by scanning them with the read light spot.

One advantage, and by no means the least important, of the sampling technique is the possibility of distinguishing between patterns by their length along the track element. Thus a radial graduation scale may be based on this parameter, which is ruled out in the case of continuous groove disks. This technique has already found an application in the use of synchronization patterns as shown in FIG. 6 where non-integer distances 2.5 L and 6.5 L are defined.

The adoption of a coding system using the duration of the access patterns is also within the scope of the present invention.

Figure 14:
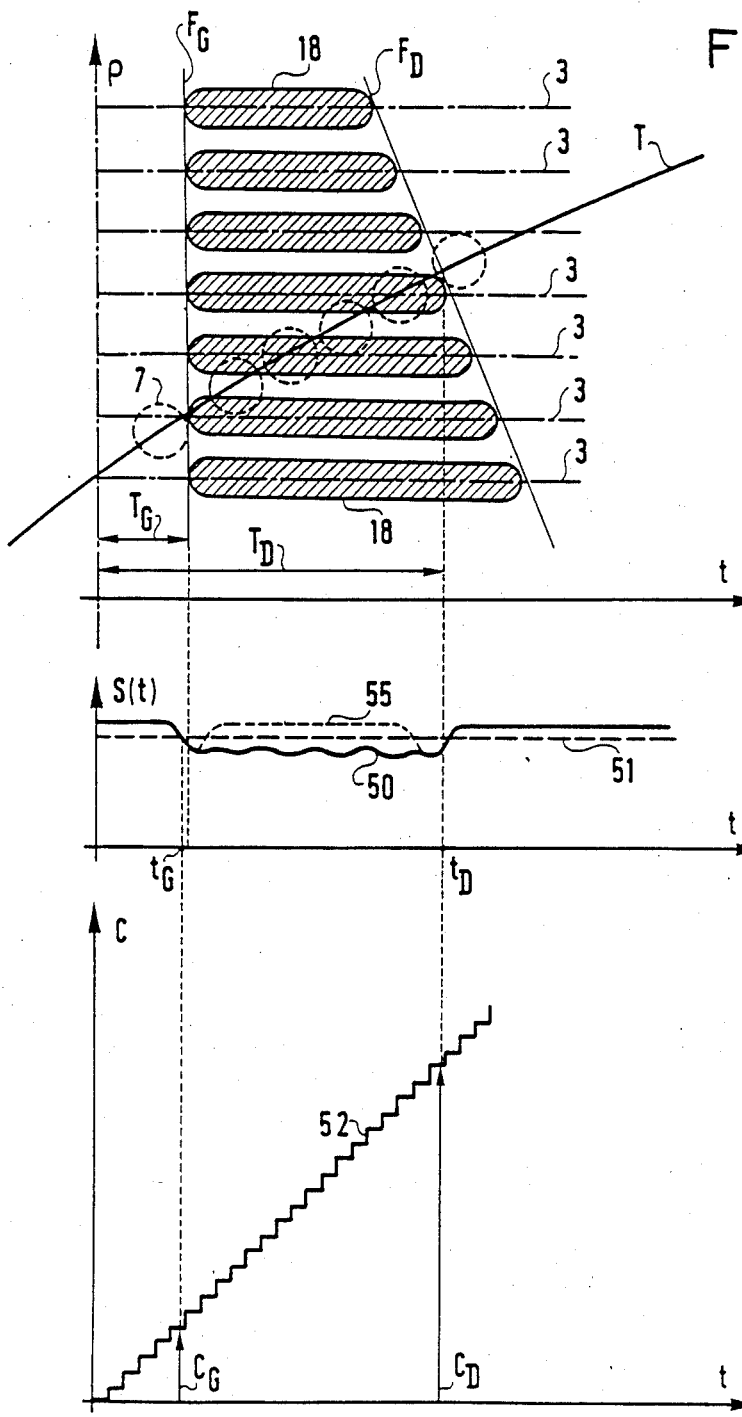
FIG. 14 shows an alternative embodiment of prewritten patterns in accordance with the invention.

FIG. 14 shows a system of axes $\rho, t$ in which t represents elapsed time, which amounts to the same thing as the distance covered along the track axes 3. In this system of axes there are shown adjacent track elements in a region containing prewritten patterns 18. A line $F_G$ forms at the lefthand end the envelope of the trailing edges of the patterns 18 and another line $F_D$ forms at the righthand end the envelope of the trailing edges of the patterns 18. The radius $\rho$ represents a timing reference for scanning of the patterns by the read light spot 7; the lines $F_G$ and $F_D$ may be regarded as representative of functions serving to establish a radial graduation scale. The interval $T_G$ does not vary from one track element to the next, since the line $F_G$ is a radius. On the other hand, the interval $T_D$ varies linearly because the line $F_D$ is at a constant angle to the disk radius.

When the scanning light spot 7 follows the trajectory T, optical interaction give rise to a photosensed signal S(t) illustrated by the curve 50 which features a depressed area corresponding to the encounter with the patterns 18.

The level of the signal S(t) outside this area is maximum because the scanning light spot illuminates a smooth part of the reference surface 2 of the disk 1. The bottom of the depression 50 is sufficiently far beneath this level to lie below a detection threshold shown by the line 51. It is therefore possible to detect the moment $t_G$ at which the signal S(t) drops below the threshold 51 and the moment $t_d$ which it rises above the threshold. By triggering a counter at the reference time defined by the radius $\rho$, there is obtained a staircase law 52 which represents the indication C of the counter as a function of time. It is therefore possible to record the counter indications at times $T_G$ and $T_D$, in other words to obtain samples $C_G$ and $C_D$ which correspond to the light spot 7 encountering the lines $F_G$ and $F_D$. The position and length of the patterns 18 may be varied to generate functions making it possible to obtain a graduation scale for the access.

The precision with which the samples are obtained depends on the resolution of the counter and on the slight fluctuation in regard to the encounters with the patterns 18.

Figure 15:
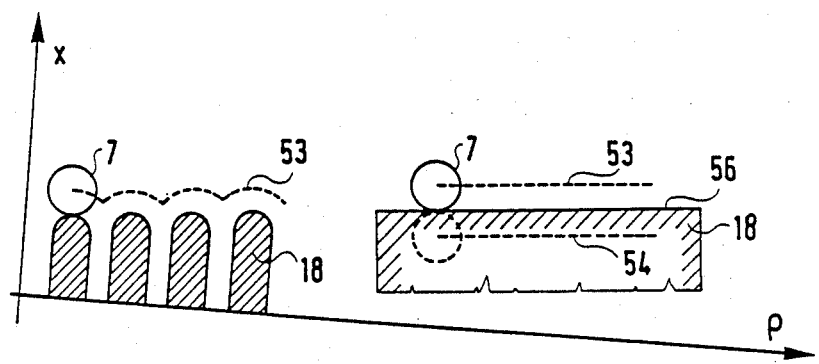
FIG. 15 is an explanatory diagram.

This fluctuation is shown in FIG. 15 which represents in a system of axes x,$\rho$ the positions of the scanning light spot 7 when weakening of the signal S(t) begins or ends. The line 53 is the geometrical locus of the center of the light spot 7 and it is seen that in the case of radially isolated paterns 18 it fluctuates slightly, leading to some imprecision in the evaluation of the times $t_G$ and $t_D$. If the patterns 18 are merged into one as shown in the righthand part of FIG. 15, the line 53 does not fluctuate. In this case the signal S(t) in FIG. 14 comprises two depressions as shown by the dashed line curve 55. By detecting these transitions a precise determination of the times $T_G$ and $T_D$ is obtained. The edges of the pattern in the curve 55 correspond to FIG. 15 to the line 54 which is an image of the line 53 relative to the edge 56 of the pattern 18.

Figure 16:
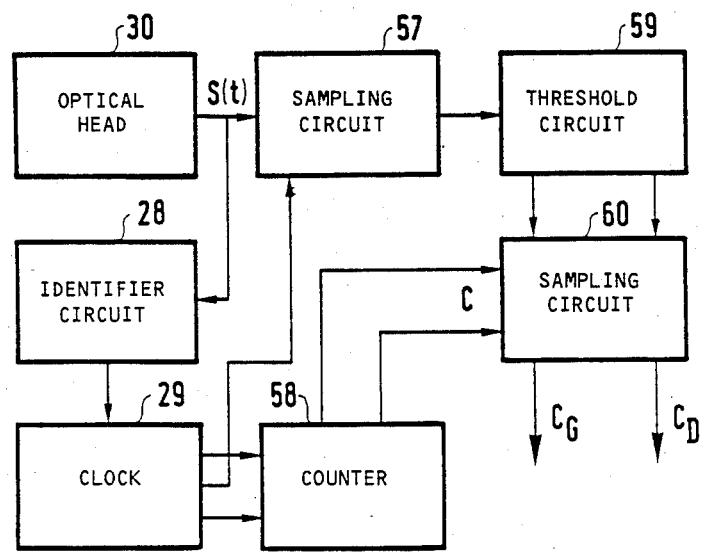
FIG. 16 is a block diagram of a circuit for acquiring digitized samples obtained from patterns encoded in terms of position or length.

With regard to the acquisition of samples $C_G$ and $C_D$, reference should now be had to FIG. 16 which repeats certain elements from FIG. 7. The optical head 30 delivers the read signal S(t) to the circuit 28 which identifies the synchronization patterns and is used to synchronize the clock 29.

The clock 29 delivers a sampling pulse of sufficient duration to encompass the range of times corresponding to the scanning of the access patterns 18 in FIG. 14. This pulse defines a window and controls the sampling circuit 57 which isolates from signal S(t) the portion containing the interaction with the access patterns. This portion is transmitted to the threshold circuit 59 which detects the times $t_C$ and $t_D$ by sending selection pulses to the sampling circuit 60.

The circuit 60 samples the indication C from a counter 58 which receives from the circuit 28 clock pulses and a reset to zero pulse which coincides with the scanning by the light spot 18 of the reference radius $\rho$ in FIG. 14.

The processing of the samples $C_G$ and $C_D$ does not differ from that previously described. The samples $C_G$ and $C_D$ may be regarded as forming part of two periodic functions in phase quadrature. It is also possible to consider sample $C_G$ as originating from a staircase function and sample $C_D$ as originating from a sawtooth function so as to identify a group G of packets P of track elements by means of a repetitive address of which $C_G$ and $C_D$ are partial addresses.

Figure 17:
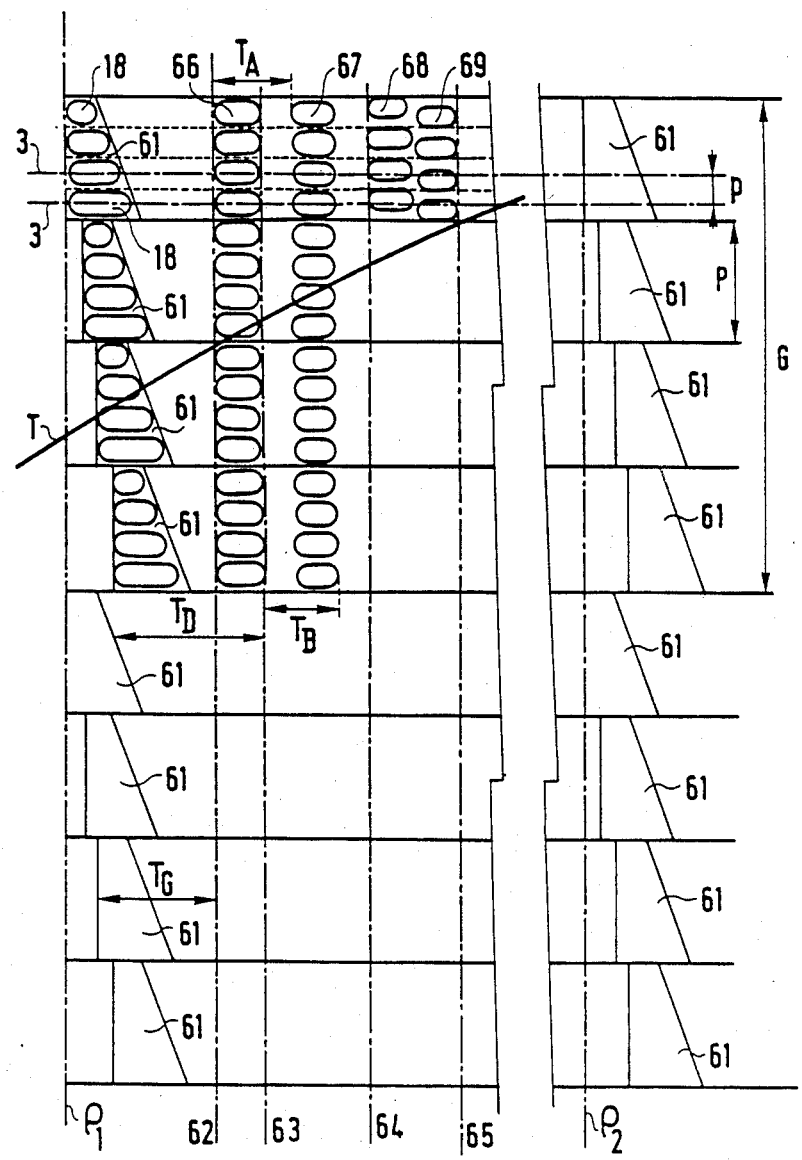
FIG. 17 shows an example of prewritten information effected by groups of packets of track elements.

FIG. 17 shows one example of prewritten information producing the radial graduation scale for the access by means of specific patterens 18 which are non-uniform in terms of position and length.

FIG. 17 shows two successive radii $\rho_1$ and $\rho_2$ without regard to their actual spacing, since the area illustrated has been split assuming that the interruption contains the data areas. In the radial direction the disk is compartmentalized into groups G of 16 track elements with axes 3. The track elements within a group G are grouped in packets P in each of which there are four elements. FIG. 17 shows that the patterns 18 specific to the access are arranged in areas 61 of trapezoidal contour. The lefthand edge of each trapezoidal contour is oriented along a radius of the disk so as to assign to each packet P of four track elements a value $T_G$ representing the offset of the lefthand edge relative to the reference radius 62. The righthand edge of each trapezoidal contour is inclined relative to the radii of the disk so as to assign to each track element of a packet a value $T_D$ representing an offset of the righthand edge relative to the radius 63. This arrangement of the patterns produces a graduation scale by means of two staircase functions, one with period 4p and the other of period 16p where p represents the increment of the track elements. FIG. 17 shows that the specific patterns 18 of the access are associated with synchronization patterns 66 and 67 which defined intervals $T_A$ and $T_B$ that identify them in the stream of patterns present on the axes 3. The edges of the pattern 66 are aligned on the reference radii 62 and 63 in order to define precisely the times of encounter with the scanning light spot even when it follows the trajectory T inclined relative to the axes 3. FIG. 17 also shows that the prewritten information may comprise patterns 68 and 69 offset relative to the axes 3 of the track elements in order to implement the track following function by sampling the range contained between the radii 64 and 65.

In the FIG. 17 example, the lefthand edge of the trapezoidal contour 61 serves as a coarse graduation scale while the righthand edge serves as a fine graduation scale. The two graduation scales are not necesarily linked up within a common trapezoidal contour since they may be provided in an alternating arrangement when there are arranged along the track elements patterns 18 which are bracketed by different trapezoidal patterns.

Figure 18:
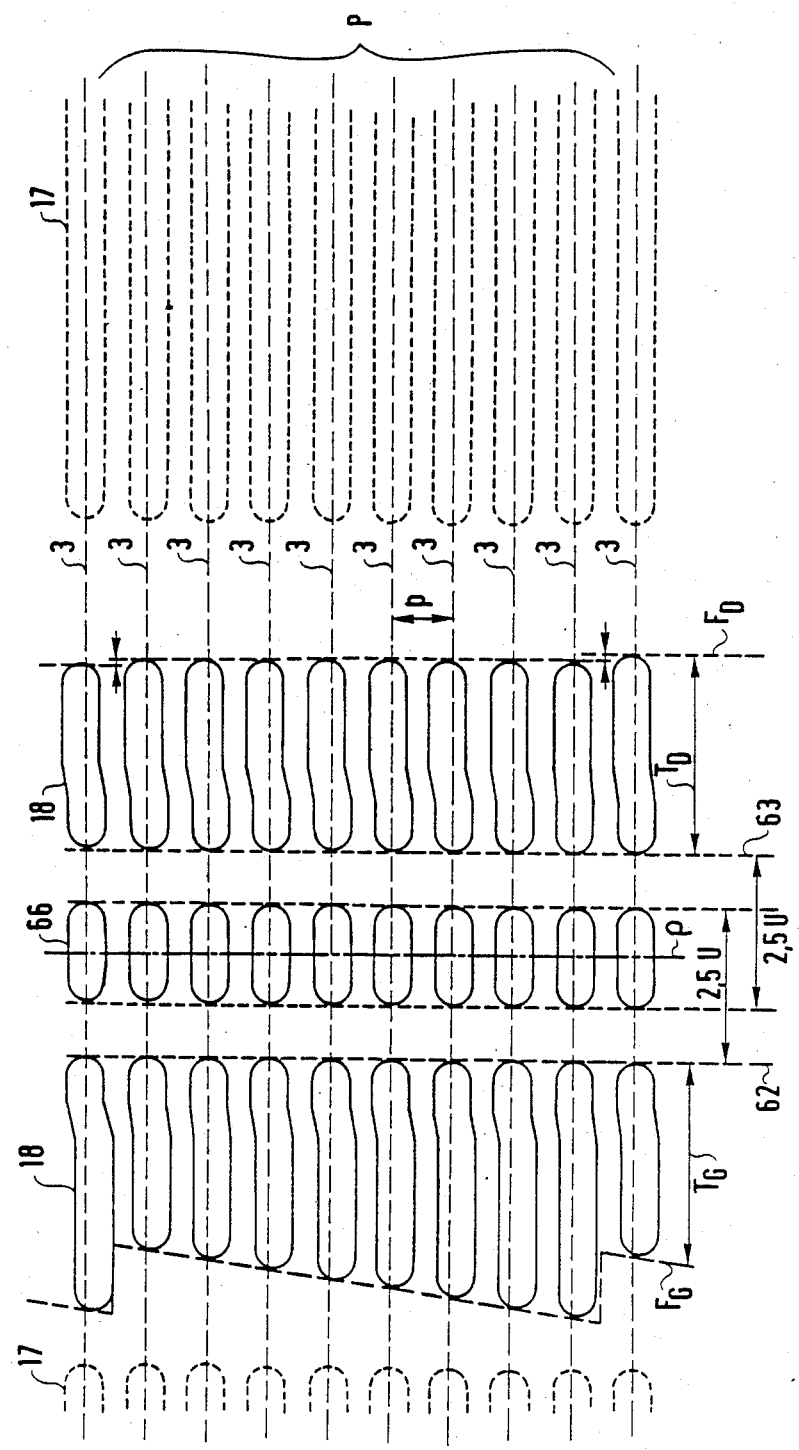
FIG. 18 shows an alternative embodiment of prewritten information shown in FIG. 17.

FIG. 18 shows anther embodiment of the prewritten patterns in accordance with the invention. There is shown in FIG. 18 a packet P of track elements 17 comprising eight elements, for example, the axes 3 of which are separated by an interval p. There is also shown at the top of the FIG. the last element of the preceding packet and at the bottom the first element of the next packet. The packets P form, for example, groups of eight so that the configuration of the prewritten patterns has a period in the radial direction equal to 64 increments p. There are shown in dashed outline data areas which lie to either side of the central region of FIG. 18 in which the prewritten patterns 18 and 66 appear. The patterns 66 centered on a radius ρ and on the axes 3 are of constant length so that their edges are aligned along radii. The term "length" is here related to the concept of angular coverage, as it must be born in mind that in reality the axes 3 are curved.

Bearing this in mind, it is seen that each pattern 66 is flanked by two patterns 18 of which the inside edges centered on the axis 3 are aligned on radii 62 and 63. FIG. 18 shows that the leading edge of the central pattern 66 is at a distance of 2.5 U from the leading edge of the pattern 18 situated to its right. Similarly the trailing edge of the pattern 66 is at a distance 2.5 U from the trailing edge of the pattern 18 to its left.

The symbol U designates a reference length along the track serving to localize the patterns specific to storage of data. It is therefore assumed that scanning the track only provides the distances 2.5 U between homologous edges of patterns for the combination 18-66-18 shown in FIG. 18. Thus this combination forms a synchronization arrangement which has the same properties as that shown in FIG. 17 by the succession of patterns 66 and 67.

In accordance with the invention the patterns 18 serve to establish a radial graduation scale obtained in FIG. 18 by modulating the positions of the outside edges of the patterns. This modulation generates envelope lines $F_G$ and $F_D$ as in FIG. 14, but in FIG. 18 the edges of the patterns 18 used to this end feature a radial offset relative to the track axes 3. This distinguishing feature, which does not prevent the materialization of the periodic graduation scale necessary to the access function, offers the advantage of also implementing the track following function and the synchronization function. To achieve this function pushed to its extreme the invention provides for the use of patterns 18 comprising at least one centered portion and an offset portion, which amounts to the same thing as in FIG. 6, where the same patterns are used to implement the access and track following functions.

In the same order of thinking, these functions may be united through prewritten patterns featuring an offset over all their length.

Figure 19:
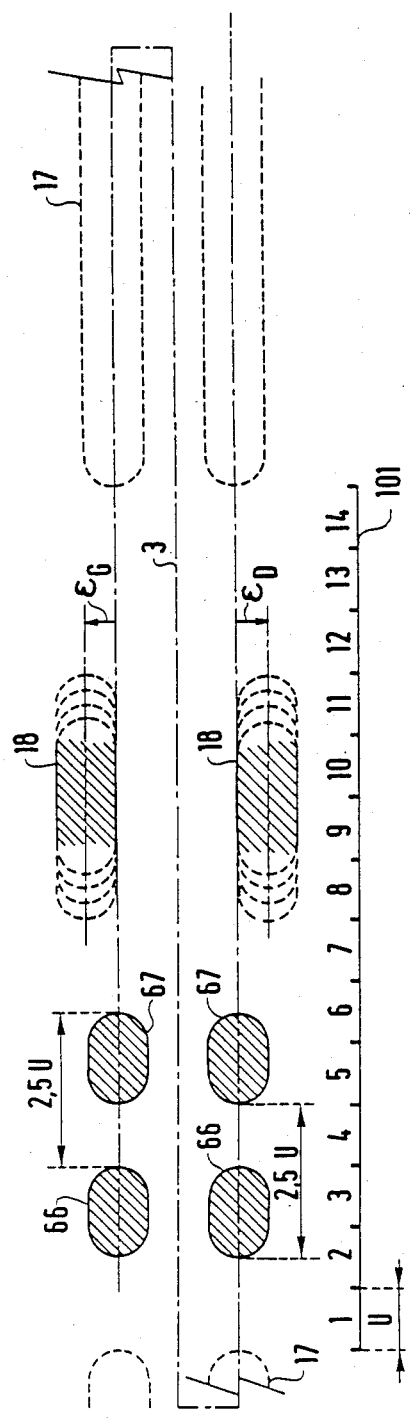
FIGS. 19 and 20 show other examples of prewritten information in accordance with the invention.

FIG. 19 shows an embodiment in which space can be saved by arranging the patterns in two areas separated by a data area 17. To show more clearly the periodic localization of the area occupied by the prewritten patterns the axis 3 of the track element has been folded twice, zig-zag fashion. The odd ranked part shown at the top of FIG. 19 begins with two synchronization patterns 66 and 67 at distances from the graduation 101 of 2.5 U. The patterns 66 and 67 are followed at an appropriate distance by an offset pattern 18. The leading and trailing edges of this pattern can occupy four positions shown by four half-circles in dashed line on the left and four half-circles in dashed line on the right. The pattern 18 is therefore an addressing arrangement used to distinguish the 16 track elements which form a packet from each other. The even ranked part shown at the bottom of FIG. 19 also comprises a pattern 18 that can serve to address 16 packets of elements forming a group of 256 track elements. A group of this kind is repeated periodically within the usable area of the disk. FIG. 19 shows that the patterns 18 alternately feature an offset $\epsilon_G$ and an offset $\epsilon_D$ used to determine the eccentricity of the read light spot relative to the axis 3.

The sampling frequency for the pair of patterns assigned to evaluation of the eccentricity is therefore reduced by half as compared with that for the synchronization patterns 66 and 67.

Figure 20:
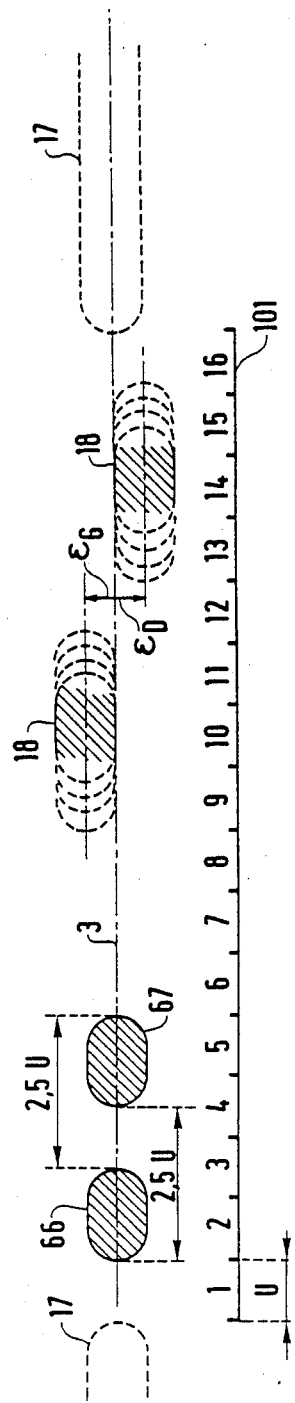

The arrangement shown in FIG. 20 samples the eccentricity of the scanning light spot twice as frequently because the two patterns 18 from FIG. 9 are joined up in the interval separating two blocks of data 17. This configuration is slightly more compact than the previous one, but it provides for a higher sampling frequency for the track following and the axis graduation functions.

Disks provided with specific prewritten patterns of an absolute or periodic type radial graduation scale may have extremely varied configurations and more or less frequent sampling as previously described. The fact that the concept of track continuity is abandoned facilitates matters greatly since access to a track becomes a process of the same kin as the processes already employed for track following, focussing and synchronization of the scanning of a disk with a read task. Providing that sampling is sufficiently frequent, it has been seen that movements can be determined without ambiguity and with a degree of precision that is entirely satisfactory in practice. The choice of prewritten patterns of simple shape does not rule out a high capacity for information and it has been seen that this capacity can be achieved in conjunction with very little space occupied on the disk. The creation of prewritten patterns specific to the access can also be done at a stage preceding any optical writing of the disk or at a post-processing stage entailing writing them. In this case, they differ from the user data only in terms of their location on the disk and in terms of the source of information by which they are conditioned. Given these conditions, everything preceding the writing of user data onto a disk is concerned with prewriting in the sense intended with respect to the present invention. Likewise, patterns are specific to the access, provided that they are arranged specifically for this purpose, even if they were assigned to other tasks that have not previously suggested the appropriate arrangement.

The foregoing description refers to a technique for identifying synchronization patterns based on the use of half-integer distances, but the invention is in no way limited to this specific instance.

Similarly, it has been seen that the scanning light spot may interact optically with the pattern in the same way whether it is totally within or totally outside its contour. In this case there is substituted for the full sampling of the pattern a marginal sampling which is readily distinguished from the case where the scanning light spot does not encounter the pattern.

There is claimed:

1. Data storage medium in the form of a disk comprising:
    a reference surface,
    a set of adjacent track elements on said reference surface,
    respective curved axes of said adjacent track elements,
    prewritten patterns on said axes,
    areas reserved for storing data on said axes alternating with said prewritten patterns,
    a common rotation center of said curved axes, a first set of N radii issuing from said common rotation center on which said patterns lie, equi-angularly separated and each defining with said axes sites of intersection, synchronization patterns occupying said sites of intersection,
    at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements,
    said radial arrangement defining the instantaneous position of said spot relative to said graduation scale when said spot scans said radial arrangement, wherein said graduation scale is adapted to generate through radial scanning of said arrangement two periodic functions with the same period between which there is a substantial phase difference.

2. Data storage medium according to claim 1, wherein said periodic functions are generated by radially scanning a row of said specific patterns.

3. Data storage medium according to claim 1, wherein said periodic functions are generated by radially scanning two rows of said specific patterns.

4. Data storage medium according to claim 3, wherein the specific patterns of a first of said two rows feature a predetermined offset relative to each of said curved axes and the specific patterns of the second of said two rows feature an offset of the same size but an opposite sign to that of the patterns of said first row.

5. Data storage medium, in the form of a disk comprising a reference surface, a set of adjacent track elements on sqaid reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, wherein said radial arrangement of patterns defines at the intersections with said axes digital addresses expressing the absolute positions thereof in reflected binary code.

6. Data storage medium according to claim 5, wherein said digital addresses are distinct from each other and a number of them is equal to the number of said axes.

7. Data storage medium in the form of a disk comprising a reference surface, a set of adjacent track elements on said reference surface, respective curved axes of said adjacent track elements, prewritten patterns on said aces, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, wherein said track elements are grouped into packets and digital addresses defined by said radial arrangement of patterns at the intersection with said axes are the same within a packet and different between one packet and the adjacent packet.

8. Data storage medium according to claim 7, wherein said packets form a group and a plurality of said groups are arranged radially in an annular area containing said track elements.

9. Data storage medium in the form of a disk comprising a reference surface, a set of adjacent track elements on said reference surface, respective curved axes of said adjacent track elements, prewritten patterns on said axes, area reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, wherein said radial arrangement of patterns represents a staircase function successive values of which are related to the relative positions of edges of said patterns relative to a reference radius as measured in the direction of said axes.

10. Data storage medium according to claim 9, wherein said staircase function is periodic.

11. Data storage medium according to claim 9, wherein at least one of said edges is in one of a plurality of predetermined positions relative to said reference radius.

12. Data storage medium according to claim 9, comprising a plurality of patterns adapted to be encountered successively on one of said axes to define a value of said staircase function assigned to said axis.

13. Data storage medium in the form of a disk comprising a reference surface, a set of adjacent track elements on said reference surface, respective curved axes of said adjacent track elements, prewritten patterns on said axes, area reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, wherein said patterns comprise a centered part and a part offset relative to said axis.

14. Data storage medium according to claim 5, wherein said digital addresses comprise at least two parts expressed by respective arrangements of patterns in sequence along said axes.

15. Data storage medium in the form of a disk comprising a reference surface, a set of adjacent track elements on said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, wherein the radii of said first set relative to which said radii of second set are offset in the circumferential direction are equi-angularly spaced.

16. Data storage medium according to claim 15, wherein said sets of radii comprise a same number of radii.

17. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:

an optical head adapted to project a focussed scanning light spot onto said reference surface, an access motor, means driven by said access motor for moving said light spot along a path traversing said track elements, photosensing means associated with said optical head adapted to recover some of the light reflected from said reference surface where it is illuminated by said light spot, and control means for said access motor, connected to receive electrical signals from said photosensing means and addressing information relative to an information access operation, said control means comprising samplig means adapted to produce in response to said light spot interacting with said graduation scale bearing radii, at least one digital value localizing said light spot in the radial direction when its motion successively straddles a plurality of said track elements, said at least one digital value representing at least the remainder produced by dividing an absolute value representing the radial position of said light spot by a number characterizing said graduation scale.

18. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:

an optical head adapted to project a focussed scanning light spot onto said reference surface,
an access motor,
means driven by said access motor for moving said light spot along a path traversing said track elements,
photosensing means associated with said optical head adapted to recover some of the light reflected from said reference surface where it is illuminated by said light spot, and
control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute value representing the radial position of said light spot by a number characterizing said graduation scale wherein said digital value is coincident with said absolute value, said characteristic number being unity.

19. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:

an optical head adapted to project a focussed scanning light spot onto said reference surface,
an access motor,
means driven by said access motor for moving said light spot along a path traversing sid track elements,
photosensing means associated with said optical head adapted to recover some of the light reflected from said reference surface where it is illuminated by said light spot, and
control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute value representing the radial position of said light spot by a number characterizing said graduation scale, wherein said characteristic number is not equal to unity and represents one increment of said graduation scale, wherein said characteristic number is not equal to unity and represents one increment of said graduation scale.

20. Optical scanning device according to claim 19, wherein said increment is the same as that of said track elements.

21. Optical scanning device according to claim 19, wherein said increment encompasses a plurality of adjacent track elements.

22. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to subfamily of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:

an optical head adapted to project a focussed scanning light spot onto said reference surface, an access motor, means driven by said access motor for moving said light spot along a path traversing said track elements, photosensing means associated with said optical head adapted to recover some of the light reflected from said reference surface where it is illuminated by said light spot, and control means for said access motor, connected to receive electrical signals from said photosensing means and addressing information relative to an information access operation, said control means comprising sampling means adapted to produce in response to said light spot interacting with said graduation scale bearig radii at least one digital value localizing said light spot in the radial direction when its motion successively straddles a plurality of said track elements, said at least one digital value representing at least the remainder produced by dividing an absolute value representing the radial position of said light spot by a number characterizing said graduation scale, wherein said sampling means comprise means for acquiring a pair of samples originating from said electrical signals, sampling control means synchronized to scanning of said synchronization patterns, means for digitizing the samples of said pair and means for determining said digital value from said pair of samples.

23. Optical scanning device according to claim 22, wherein said digital value is an angle of a vector having said pair of samples for components.

24. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to subfamily of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:

an optical head adapted to project a focussed scanning light spot onto said reference surface, an access motor, means driven by said access motor for moving said light spot along a path traversing said track elements, photosensing means associated with said optical head adapted to recover some of the light reflected from said reference surface where it is illuminated by said light spot, and control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute value representing the radial position of said light spot by a number charcterizing said graduation scale, wherein said sampling means comprise means for acquiring a portion of said electrical signals enclosing transitions which correspond to said scanning light spot encountering edges of said specific patterns, sampling control means synchronized on the basis of scanning said synchronization patterns, counting means initialized by said control means and means acquiring said digital value in coincidence with one at least one of said transitions and forming the indication given by said counting means.

25. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to subfamily of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:

an optical head adapted to project a focussed scanning light spot onto said reference surface, an access motor, means driven by said access motor for moving said light spot along a path traversing said track elements, photosensing means associated with said optical head adapted to recover some of the light reflected from said reference surface where it is illuminated by said light spot, and control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute value representing the radial position of said light spot by a number characterizing said graduation scale, wherein a plurality of said transitions provide digital values characteristic of encounters with leading and trailing edges of said specific patterns.

26. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes site of intersection, synchronization patterns occupying said sites of intersection, at least one other set of radii issuing from said common rotation center with a predetermined circumferential offset relative to P of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:

an optical head adatped to project a focussed scanning light spot onto said reference surface, an access motor, means driven by said access motor for moving said light spot along a path traversing said track elements, photosensing means associated with said optical head adapted to recover some of the light reflected from said reference surface where it is illuminated by said light spot, and control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute value representing the radial position of said light spot by a number characterizing said graduation scale, wherein said sampling means comprise means for acquiring samples adapted to express said digital value on the basis of an address in reflected binary code controlling sampling and synchronized with the scanning of said synchronization patterns.

27. Optical scanning device according to claim 26, wherein said digital value results from an interpretation of at least part of said address.

28. Optical scanning device according to claim 26, wherein parts of said address are sampled at non-contiguous locations along said axes.

29. Optical scanning device according to claim 28, wherein selected address parts are sampled more frequently than others.

30. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to subfamily of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:

an optical haed adapted to project a focussed scanning light spot onto said reference surface, an access motor, means driven by said access motor for moving said light spot along a path traversing said track elements, photosensing means associated with said optical head adapted to recover some of the light reflected from said reference surface where it is illuminated by said light spot, and control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute value representing the radial position of said light spot by a number characterizing said graduation scale, wherein said sampling means comprise means for acquiring said digital value based on said scanning light spot encountering edges of said specific patterns, such encounters being adapted to occur at sampling times featuring determined offsets relative to the synchronization pulses produced by scanning said synchronization patterns.

31. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:
- an optical head adapted to project a focussed scanning light spot onto said reference surface,
- an access motor,
- means driven by said access motor for moving said light spot along a path traversing said track elements,
- photosensing means associated with said optical head adapted to recover some of the light reflected from said reference surface where it is illuminated by said light spot,
- control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute value representing the radial position of said light spot by a number characterizing said graduation scale, and
- means for processing said digital value so that by linear extrapolation and by taking account of a previously sampled digital value a new absolute value magnitude can be validated given the previous value.

32. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axes alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:
- an optical head adapted to project a focussed scanning light spot onto said reference surface,
- an access motor,
- means driven by said access motor for moving said light spot along a path traversing said track elements,
- photosensing means associated with said optical head adapted to recover some of the light reflected from said reference surface where it is illuminated by said light spot, and
- control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in the radial direction when its motion successively straddles a plurality of said track elements, said at least one digital value representing at least the remainder produced by dividing an absolute value representing the radial position of said light spot by a number characterizing said graduation scale, wherein said sampling means provide samples used to control track following.

33. Optical scanning device adapted to utilize a data storage medium in the form of a disk comprising a reference surface, a set of adjacent track elements in said reference surface, respective curved axes of said adjacent track elements, prewritten patterns on said axes, areas reserved for storing data on said axis alternating with said prewritten patterns, a common rotation center of said curved axes, a first set of N radii issuing from said common rotation center on which said patterns lie, equi-angularly separated and each defining with said axes sites of intersection, synchronization patterns occupying said sites of intersection, at least one other set of radii issuing from said common rotation center with a predetermined circumferential offset relative to sub-family of said N radii, and a graduation scale on said radii of said at least one other set consisting of a radial arrangement of specific patterns adapted to interact optically and repeatedly with a focussed reading light spot scanning said reference surface transversely of said tracks in order to sense the sign of radial displacement of said spot within said set of adjacent track elements, said radial arrangement defining the instantaneous position of said spot relative to said graduation scale when said spot scans said radial arrangement, said device comprising:
- an optical head adapted to project a focussed scanning light spot onto said reference surface,
- an access motor,
- means driven by said access motor for moving said light spot along a path traversing said track elements,
- photosensing means associated with said optical head adapted to recover some of the light reflected from said reference surface where it is illuminated by said light spot, and
- control means for said access motor, connected to receive electrical signals from said photosensing means and addressing information relative to an information access operation, said control means comprising sampling means adapted to produce in response to said light spot interacting with said graduation scale bearing radii at least one digital value localizing said light spot in radial direction when its motion successively straddles a plurality of said track elements, said at least one digital value representing at least the remainder produced by dividing an absolute value representing the radial position of said light spot by a number characterizing said graduation scale, wherein said sampling means provide transitions serving to identify synchronization patterns.

* * * * *